US010508826B2

(12) United States Patent
Takenaka et al.

(10) Patent No.: US 10,508,826 B2
(45) Date of Patent: Dec. 17, 2019

(54) REFRIGERATION CYCLE APPARATUS

(71) Applicant: Mitsubishi Electric Corporation, Chiyoda-ku (JP)

(72) Inventors: Naofumi Takenaka, Chiyoda-ku (JP); Shinichi Wakamoto, Chiyoda-ku (JP); Kazuya Watanabe, Chiyoda-ku (JP); Naomichi Tamura, Chiyoda-ku (JP); Tadashi Ariyama, Chiyoda-ku (JP); Koji Yamashita, Chiyoda-ku (JP); Takeshi Hatomura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 228 days.

(21) Appl. No.: 15/541,062

(22) PCT Filed: Jan. 13, 2015

(86) PCT No.: PCT/JP2015/050697
§ 371 (c)(1),
(2) Date: Jun. 30, 2017

(87) PCT Pub. No.: WO2016/113851
PCT Pub. Date: Jul. 21, 2016

(65) Prior Publication Data
US 2017/0370627 A1 Dec. 28, 2017

(51) Int. Cl.
*F24F 11/89* (2018.01)
*F25B 41/06* (2006.01)
*F25B 47/02* (2006.01)

(52) U.S. Cl.
CPC ............ *F24F 11/89* (2018.01); *F25B 41/062* (2013.01); *F25B 47/022* (2013.01);
(Continued)

(58) Field of Classification Search
CPC .............. F25B 13/00; F25B 2313/0233; F25B 2313/0251; F25B 2313/0253; F25B 2313/02532
See application file for complete search history.

(56) References Cited

U.S. PATENT DOCUMENTS 3,664,150 A * 5/1972 Patterson .................. F25B 5/02
62/152
2006/0144060 A1* 7/2006 Birgen .................... F25B 13/00
62/151
(Continued)

FOREIGN PATENT DOCUMENTS

CN 101451779 A 6/2009
EP 2 930 450 A1 10/2015
(Continued)

OTHER PUBLICATIONS

International Search Report dated Apr. 7, 2015 in PCT/JP2015/050697 filed Jan. 13, 2015.
(Continued)

*Primary Examiner* — Henry T Crenshaw
(74) *Attorney, Agent, or Firm* — Oblon, McClelland, Maier & Neustadt, L.L.P.

(57) ABSTRACT

An air-conditioning apparatus includes a selection unit and a determination unit, the selection unit selecting a reverse-defrosting operation mode or a heating-defrosting simultaneous operation mode, the reverse-defrosting operation mode being a mode in which all of parallel heat exchangers are defrosted by stopping a heating operation, the heating-defrosting simultaneous operation mode being a mode in which each parallel heat exchanger is sequentially defrosted while continuing a heating operation, the determination unit determining whether or not a defrosting operation is to be started, in which the determination unit is configured to start the defrosting operation in a state where the amount of frost deposited on the parallel heat exchangers is smaller in a case where the heating-defrosting simultaneous operation mode is selected than in a case where the reverse-defrosting operation is selected.

19 Claims, 15 Drawing Sheets

(52) U.S. Cl.
CPC . *F25B 2313/006* (2013.01); *F25B 2313/0251* (2013.01); *F25B 2313/02532* (2013.01); *F25B 2313/0315* (2013.01); *F25B 2341/0661* (2013.01); *F25B 2500/02* (2013.01)

(56) References Cited

U.S. PATENT DOCUMENTS

| | | | | |
|---|---|---|---|---|
| 2011/0232308 | A1* | 9/2011 | Morimoto | F25B 13/00 62/132 |
| 2012/0043056 | A1* | 2/2012 | Shimazu | F24F 3/065 165/96 |
| 2013/0098092 | A1* | 4/2013 | Wakamoto | F25B 1/10 62/278 |
| 2015/0292789 | A1 | 10/2015 | Takenaka et al. | |
| 2016/0116202 | A1* | 4/2016 | Takenaka | F25B 13/00 62/140 |

FOREIGN PATENT DOCUMENTS

| | | |
|---|---|---|
| JP | 62-123264 A | 6/1987 |
| JP | 11-83117 A | 3/1999 |
| JP | 2002-107014 A | 4/2002 |
| JP | 2008-101819 A | 5/2008 |
| WO | 2014/083867 A1 | 6/2014 |
| WO | WO 2014/083650 A1 | 6/2014 |
| WO | 2014/192140 A1 | 12/2014 |

OTHER PUBLICATIONS

Extended European Search Report dated Aug. 6, 2018 in Patent Application No. 15877806.8, 7 pages.
Combined Chinese Office Action and Search Report dated Mar. 4, 2019 in Patent Application No. 201580072550.7 (with English translation of the Office Action and English Translation of Category of Cited Documents), 22 pages.

* cited by examiner

FIG. 6

| VALVE NUMBER | COOLING | HEATING | | CONTINUOUS HEATING (HEATING-DEFROSTING SIMULTANEOUS) | |
|---|---|---|---|---|---|
| | | NORMAL OPERATION | REVERSE DEFROSTING | 50-1: EVAPOLATOR 50-2: DEFROSTING | 50-1: DEFROSTING 50-2: EVAPOLATOR |
| 2 | OFF | ON | OFF | ON | ON |
| 4-b, 4-c | INDOOR UNIT OUTLET COOLING SUPERHEATING | INDOOR UNIT OUTLET COOLING SUBCOOLING | FULL OPEN | INDOOR UNIT OUTLET COOLING SUBCOOLING | INDOOR UNIT OUTLET COOLING SUBCOOLING |
| 7-1 | FULL OPEN | FULL OPEN | FULL OPEN | FULL OPEN | DEFROSTING HEAT EXCHANGE PRESSURE |
| 7-2 | FULL OPEN | FULL OPEN | FULL OPEN | DEFROSTING HEAT EXCHANGE PRESSURE | FULL OPEN |
| 8-1 | ON | ON | ON | ON | OFF |
| 8-2 | ON | ON | ON | OFF | ON |
| 9-1 | OFF | OFF | OFF | OFF | ON |
| 9-2 | OFF | OFF | OFF | ON | OFF |
| 10 | CLOSED | CLOSED | CLOSED | FIXED OPENING DEGREE | FIXED OPENING DEGREE |

REFRIGERATION CYCLE APPARATUS

TECHNICAL FIELD

The present invention relates to a refrigeration cycle apparatuses used for, for example, air-conditioning apparatuses and other devices.

BACKGROUND ART

In recent years, from the viewpoint of global environment preservation, instead of boiler-type heating systems that perform heating by burning fossil fuels, heat-pump-type air-conditioning apparatuses using air as a heat source have been increasingly introduced also in cold climate areas. A heat-pump-type air-conditioning apparatus can efficiently perform heating by electrically operating a compressor and by taking heat from air.

On the other hand, however, in a heat-pump-type air-conditioning apparatus, as the temperature (outside air temperature) of air outdoors (outside air) or the like gets lower, frost is more likely to be deposited on an outdoor heat exchanger that exchanges heat as an evaporator between outside air and refrigerant. Accordingly, it is necessary to perform defrosting (remove frost) to melt frost deposited on the outdoor heat exchanger. As an example of a defrosting method, there is a method (hereinafter also referred to as a reverse cycle defrosting) for supplying refrigerant discharged from a compressor to the outdoor heat exchanger by reversing the refrigerant flow used for heating. However, since this method is performed in some cases by stopping indoor heating during defrosting, there is a problem that the level of comfort is decreased.

Thus, to enable heating even during defrosting, for example, the following method (hereinafter also referred to as a heating-defrosting simultaneous operation) is proposed (see, for example, Patent Literature 1). In this method, while defrosting a part of the outdoor heat exchanger by, for example, dividing the outdoor heat exchanger, another outdoor heat exchanger serves as an evaporator to receive heat from outside air and to perform heating.

For example, with the technique disclosed in Patent Literature 1, the outdoor heat exchanger is divided into a plurality of parallel heat exchangers, part of refrigerant at high temperature discharged from a compressor is allowed to flow into the parallel heat exchangers alternately, and the parallel heat exchangers are defrosted alternately. Accordingly, the air-conditioning apparatus according to Patent Literature 1 can perform heating continuously as a whole device. At this time, in a parallel heat exchanger that is a defrosting target, defrosting is performed in a state where the refrigerant pressure inside the parallel heat exchanger is equal to a pressure (pressure corresponding to a temperature relatively higher than zero degrees Celsius in the saturation temperature conversion) that is lower than the discharge pressure and higher than the suction pressure of a compressor, and defrosting is performed with a low refrigerant flow rate by using the latent heat of condensation of refrigerant. In addition, the air-conditioning apparatus according to Patent Literature 1 is configured such that the refrigerant that has been used for defrosting flows into the outdoor heat exchanger that is serving as an evaporator. Furthermore, the air-conditioning apparatus according to Patent Literature 1 determines the presence or absence of frost formation on the basis of a decrease in the suction pressure of the compressor to start defrosting.

In addition, as an air-conditioning apparatus of the related art, an air-conditioning apparatus including a bypass that branches refrigerant discharged from a compressor and supplies the refrigerant to an outdoor heat exchanger is also proposed (for example, see Patent Literatures 2 and 3). The air-conditioning apparatus according to Patent Literatures 2 and 3 enables a defrosting operation (a normal-cycle defrosting operation) in which refrigerant discharged from a compressor is supplied to an outdoor heat exchanger through a bypass without changing the refrigerant flow used for heating and a defrosting operation (an inverse-cycle defrosting operation) in which refrigerant discharged from the compressor is supplied to the outdoor heat exchanger by reversing the refrigerant flow used for heating. In the configuration of the air-conditioning apparatus according to Patent Literatures 2 and 3, during both the normal-cycle defrosting operation and the inverse-cycle defrosting operation, the outdoor heat exchanger is not serving as an evaporator, and heating cannot be performed.

CITATION LIST

Patent Literature

Patent Literature 1: International Publication No. 2014/083867
Patent Literature 2: Japanese Unexamined Patent Application Publication No. 2008-101819
Patent Literature 3: Japanese Unexamined Patent Application Publication No. 2002-107014

SUMMARY OF INVENTION

Technical Problem

As described above, the air-conditioning apparatus of the related art, which can perform the inverse-cycle defrosting operation alone, and the air-conditioning apparatus according to Patent Literatures 2 and 3, which can perform both the normal-cycle defrosting operation and the inverse-cycle defrosting operation, do not have to perform indoor heating during a defrosting operation, and thus, the outdoor heat exchanger is not serving as an evaporator. Accordingly, these air-conditioning apparatuses may estimate the frost formation state on the basis of, for example, the operation time period in accordance with the outside air temperature or the like and the value detected by a temperature sensor attached to a pipe of the outdoor heat exchanger or the like, and may perform a heating operation in which frost is deposited on the outdoor heat exchanger until a limit until which the outdoor heat exchanger can serve as an evaporator, and then may start defrosting.

On the other hand, during the heating-defrosting simultaneous operation described in Patent Literature 1, for example, one or more of the parallel heat exchangers serve as evaporators even during defrosting. Accordingly, the air-conditioning apparatus according to Patent Literature 1 needs to start defrosting in advance in a state where the amount of frost deposited on the parallel heat exchangers is small so that one or more of the parallel heat exchangers can serve as evaporators after the start of defrosting of the parallel heat exchangers. If the outside air temperature is low, the heat exchange amount of a heat exchanger that serves as an evaporator is decreased. Accordingly, to efficiently perform defrosting, as in reverse defrosting of the related art, defrosting may preferably be performed on the entire surface of the heat exchanger upon temporarily stopping indoor heating.

However, Patent Literature 1 does not discuss the control of the evaporators and the determination of the start of defrosting to efficiently perform defrosting. In addition, although Patent Literatures 2 and 3 describe an air-conditioning apparatus that employs different methods for determining the start of defrosting depending on the defrosting method, there seems to be no description of a method for determining the start of defrosting to efficiently perform defrosting by the air-conditioning apparatus that performs the heating-defrosting simultaneous operation in which the outdoor heat exchanger is defrosted without stopping heating performed by an indoor unit.

Accordingly, the present invention is made to overcome the above problems and provides a refrigeration cycle apparatus that can perform a heating-defrosting simultaneous operation and that can more efficiently perform defrosting than in the related art.

Solution to Problem

A refrigeration cycle apparatus according to an embodiment of the present invention includes a main circuit including a compressor, a flow switching device configured to switch a passage of refrigerant discharged from the compressor, a first heat exchanger configured to serve at least as a condenser, a flow rate adjusting device provided for the first heat exchanger, and a plurality of parallel heat exchangers provided in parallel with each other and each being a second heat exchanger configured to serve at least as an evaporator; a defrosting circuit configured to branch part of the refrigerant discharged from the compressor and allow the branched refrigerant to flow into selected one or more of the plurality of parallel heat exchangers; a detector configured to detect an amount of frost deposited on at least one of the plurality of parallel heat exchangers or detect an index for determining the amount of frost formation; and a controller configured to control the flow switching device and the defrosting circuit, the controller including a selection unit configured to select one of a reverse-defrosting operation mode and a heating-defrosting simultaneous operation mode as a mode for performing a defrosting operation for defrosting the parallel heat exchangers, the reverse-defrosting operation mode being an operation mode in which the flow switching device is switched to connect the passage of the refrigerant discharged from the compressor to the second heat exchanger to defrost all of the parallel heat exchangers, the heating-defrosting simultaneous operation mode being an operation mode in which the refrigerant discharged from the compressor is allowed to flow into one or more of the parallel heat exchangers by the defrosting circuit, the one or more of the parallel heat exchangers serve as heat exchangers that are defrosting targets, and one or more of the parallel heat exchangers other than the heat exchangers that are defrosting targets serve as evaporators, and a determination unit configured to determine whether or not the defrosting operation is to be started based on a result of detection performed by the detector, the determination unit being configured to start the defrosting operation in a state where the amount of frost deposited on the parallel heat exchangers is smaller in a case where the heating-defrosting simultaneous operation mode is selected than in a case where the reverse-defrosting operation mode is selected Advantageous Effects of Invention According to an embodiment of the present invention, it is possible to efficiently defrost the parallel heat exchangers that are defrosting targets without reducing a heating capacity or defrosting capacity due to an excessively large amount of frost deposited on the evaporators during a defrosting operation.

BRIEF DESCRIPTION OF DRAWINGS

FIG. 6 is a diagram illustrating ON/OFF of each valve and the state of opening-degree adjusting control in each operation mode of the air-conditioning apparatus 100 according to Embodiment 1 of the present invention.

DESCRIPTION OF EMBODIMENTS

Figure 1:
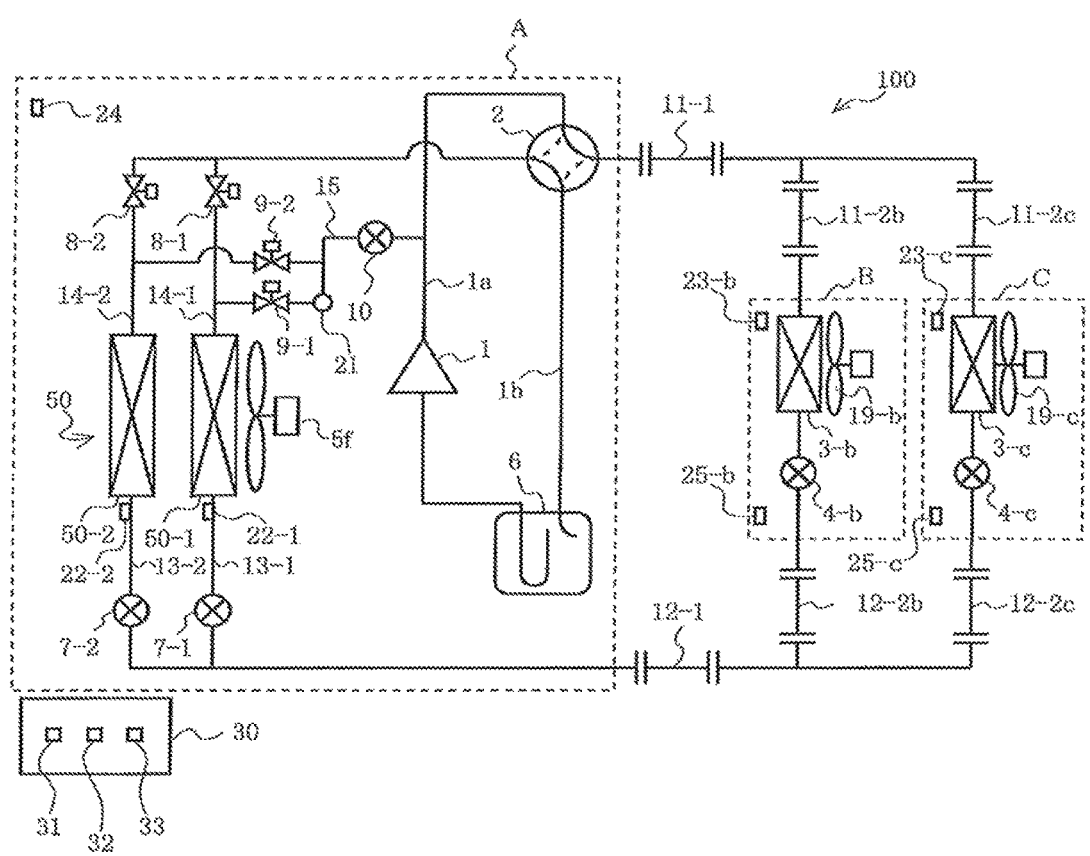
FIG. 1 is a diagram illustrating the configuration of an air-conditioning apparatus 100 according to Embodiment 1 of the present invention.

Now, an air-conditioning apparatus using a refrigeration cycle apparatus according to an embodiment will be described below as an example of the refrigeration cycle apparatus according to the present invention with reference to the drawings and so on. Herein, in the following drawings including FIG. 1, components denoted by the same reference numeral are identical or corresponding components, which applies throughout the embodiments described below. In addition, the forms of the components described throughout the specification are merely examples and are not limited to the forms described in the specification. In particular, the combination of components is not limited only to the combination illustrated in each of the embodiments, and a component described in an embodiment can be applied to another embodiment. Furthermore, for example, a plurality of devices of the same type are distinguished from each other by being denoted by indices or branch numbers, but may be described without indices or the like if they do not have to be distinguished from each other or identified. In addition, the dimensional relationship between the components in the drawings may be different from the actual dimensional relationship. Furthermore, high temperature and low temperature, high pressure and low pressure, and the like are not particularly determined in relation to absolute values, but are determined relatively on the basis of the state, operation, and the like of a system, device, and the like.

Embodiment 1

FIG. 1 is a diagram illustrating the configuration of an air-conditioning apparatus 100 according to Embodiment 1 of the present invention.

The air-conditioning apparatus 100 according to Embodiment 1 includes an outdoor unit A serving as a heat source side unit and a plurality of indoor units (use side units) B and C that are connected in parallel to each other. The outdoor unit A and the indoor units B and C are connected to one another via first extension pipes 11-1, 11-2b, and 11-2c and second extension pipes 12-1, 12-2b, and 12-2c to form a refrigerant circuit.

The air-conditioning apparatus 100 further includes a controller 30. The controller 30 controls a later-described cooling-heating switching device 2, a defrosting circuit, and the like to perform a cooling operation or a heating operation (a normal heating operation, a reverse-defrosting operation, and a heating-defrosting simultaneous operation) of the indoor units B and C. Here, the controller 30 according to Embodiment 1 includes a selection unit 31, a determination unit 32, and a time-measuring unit 33. The selection unit 31 selects, as a mode for performing a defrosting operation, a reverse-defrosting operation mode or a heating-defrosting simultaneous operation mode. The determination unit 32 determines whether or not a defrosting operation is to be started. The time-measuring unit 33 measures time periods of a normal heating operation, a defrosting operation, and the like. The controller 30 (i.e., the selection unit 31, the determination unit 32, and the time-measuring unit 33) includes, for example, a control processing unit such as a CPU (central processing unit), a storing unit that stores data of a processing procedure for control or the like in the form of a program, and the like.

The refrigerant that circulates in the refrigerant circuit here can be, for example, a Freon refrigerant, an HFO refrigerant, or the like. Examples of the Freon refrigerant include R32, R125, R134a, and the like, which are HFC-based refrigerants, and R410A, R407c, R404A, and the like, which are mixtures of the HFC-based refrigerants. Examples of the HFO refrigerant include HFO-1234yf, HFO-1234ze (E), HFO-1234ze(Z), and the like. Other applicable refrigerants include refrigerants used in vapor compression heat pump circuits, such as a $CO_2$ refrigerant, an HC refrigerant (e.g., propane or isobutene refrigerant), an ammonia refrigerant, and a mixture of the above-described refrigerants such as a mixture of R32 and HFO-1234yf.

Note that although Embodiment 1 describes an example in which the two indoor units B and C are connected to the one outdoor unit A, the number of the indoor units may be one. Further, two or more outdoor units may be connected in parallel. In addition, three extension pipes can be connected in parallel. Furthermore, it is also possible to configure a refrigerant circuit that enables, by providing a switching valve on the indoor unit side, for example, a cooling-heating simultaneous operation in which cooling or heating is selected for each indoor unit.

Next, the configuration of the refrigerant circuit in the air-conditioning apparatus 100 according to Embodiment 1 will be described. The refrigerant circuit of the air-conditioning apparatus 100 includes, as a main circuit, a refrigerant circuit in which a compressor 1, indoor heat exchangers 3-b and 3-c, flow rate control devices 4-b and 4-c provided for the indoor heat exchangers 3-b and 3-c, and an outdoor heat exchanger 5 (parallel heat exchangers 50-1 and 50-2) are sequentially connected via pipes. The air-conditioning apparatus 100 according to Embodiment 1 further includes an accumulator 6 in the main circuit. The accumulator 6 accumulates surplus refrigerant of a necessary refrigerant amount at the time of cooling or heating. Note that the accumulator 6 is not an indispensable component. For example, also in a section other than the suction side of the compressor 1 in the refrigerant circuit, any container that accumulates a liquid refrigerant may suffice.

Here, the cooling-heating switching device 2 switches the passage of refrigerant discharged from the compressor 1 and corresponds to a flow switching device according to the present invention. In addition, each of the indoor heat exchangers 3-b and 3-c corresponds to a first heat exchanger according to the present invention, and the outdoor heat exchanger 5 corresponds to a second heat exchanger according to the present invention.

The indoor units B and C include, respectively, the indoor heat exchangers 3-b and 3-c, the flow rate control devices 4-b and 4-c, and indoor fans 19-b and 19-c. The indoor heat exchangers 3-b and 3-c exchange heat between refrigerant and indoor (air-conditioning target) air. For example, during a cooling operation, the indoor heat exchangers 3-b and 3-c serve as evaporators, exchange heat between refrigerant and indoor (air-conditioning target) air, and evaporate and vaporize refrigerant. During a heating operation, the indoor heat exchangers 3-b and 3-c serve as condensers (radiators), exchange heat between refrigerant and indoor air, and condense and liquefy refrigerant. The indoor fans 19-b and 19-c generate air flow in such a manner that indoor air passes through the indoor heat exchangers 3-b and 3-c to be sent indoors, for example. In addition, the flow rate control devices 4-b and 4-c are formed of electronic expansion valves, for example. By changing the opening degrees of the flow rate control devices 4-b and 4-c on the basis of an instruction from the controller 30, the flow rate control devices 4-b and 4-c adjust the pressure, temperature, and other parameters of refrigerant inside the indoor heat exchangers 3-b and 3-c, for example.

Next, the configuration of the outdoor unit A will be described. The compressor 1 sucks refrigerant and then compresses and discharges the refrigerant. Here, the compressor 1 may, but not limited to, change the capacity (the amount of refrigerant to be sent in a unit time) by arbitrarily changing the driving frequency by using an inverter circuit or the like. The cooling-heating switching device 2 is connected between a discharge pipe 1a on the discharge side of the compressor 1 and a suction pipe 1b on the suction side thereof and switches the flow direction (passage) of refrigerant discharged from the compressor 1. The cooling-heating switching device 2 is formed of a four-way valve, for example. The cooling-heating switching device 2 is controlled by the controller 30. The controller 30 switches the passage in the cooling-heating switching device 2 so as to be connected as indicated by solid lines in FIG. 1 during a heating operation. The controller 30 switches the passage in the cooling-heating switching device 2 so as to be connected as indicated by dotted lines in FIG. 1 during a cooling operation.

The outdoor heat exchanger 5 exchanges heat between refrigerant and outside air (outdoor air). For example, during a cooling operation, the outdoor heat exchanger 5 serves as a condenser, exchanges heat between refrigerant and outside air, and condenses and liquefies refrigerant. During a heating operation (during a normal heating operation and a heating-defrosting simultaneous operation), the outdoor heat exchanger 5 serves as an evaporator, exchanges heat between refrigerant and outside air, and evaporates and vaporizes refrigerant. An outdoor fan 5f delivers outside air (outdoor air) to the outdoor heat exchanger 5. In Embodiment 1, the outdoor heat exchanger 5 and the outdoor fan 5f are configured as follows, for example.

Figure 2:
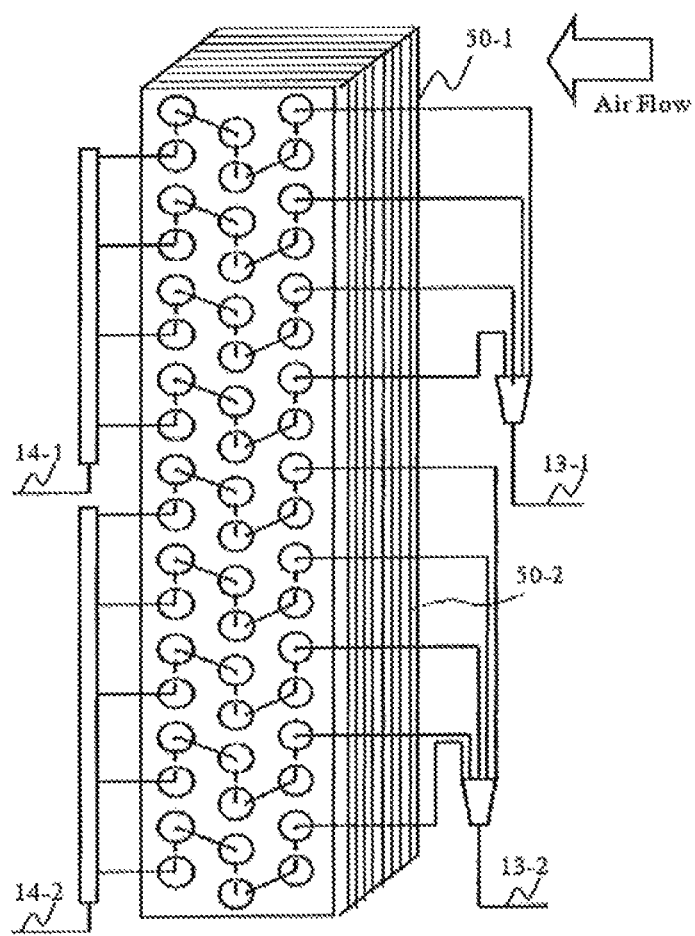
FIG. 2 is a diagram illustrating an example of the configuration of an outdoor heat exchanger 5 according to Embodiment 1 of the present invention.
Figure 4:
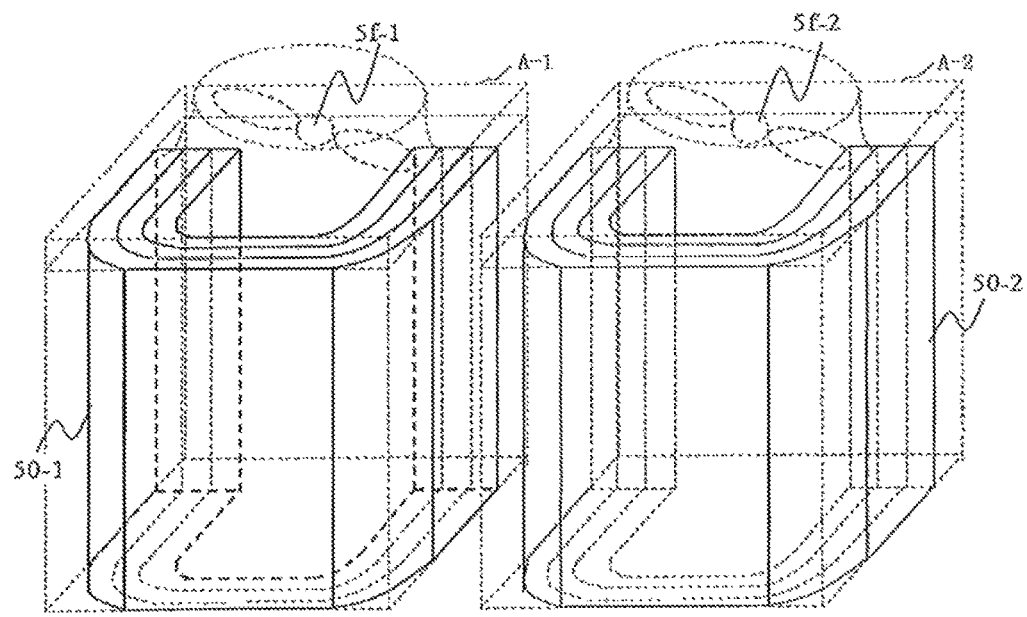
FIG. 4 is a diagram illustrating another example of the configuration of the outdoor unit A according to Embodiment 1 of the present invention.

FIG. 2 is a diagram illustrating an example of the configuration of the outdoor heat exchanger 5 according to Embodiment 1 of the present invention. In addition, FIG. 4 is a diagram illustrating an example of the configuration of the outdoor unit A in which the outdoor heat exchanger 5 illustrated in FIG. 2 is installed.

As illustrated in FIG. 2, the outdoor heat exchanger 5 according to Embodiment 1, which serves as a heat source side heat exchanger, is a fin-tube type heat exchanger including a plurality of heat transfer tubes 5a and a plurality of fins 5b, for example. In addition, the outdoor heat exchanger 5 according to Embodiment 1 is configured by being divided into a plurality of parallel heat exchangers 50. The plurality of parallel heat exchangers 50 are provided in parallel with each other (see FIG. 1). Here, the case in which the outdoor heat exchanger 5 is divided into the two parallel heat exchangers 50-1 and 50-2 will be described as an example.

As illustrated in FIG. 2, the refrigerant passes through the inside of the plurality of heat transfer tubes 5a, which are provided along the row direction, which is vertical to an air passage direction (direction shown by the outlined arrow in FIG. 2), and along the column direction, which is the air passage direction. In addition, the fins 5b are arranged at intervals so that air passes in the air passage direction. The outdoor heat exchanger 5 is divided into the two parallel heat exchangers 50-1 and 50-2 in the up-down direction. Note that in FIG. 2, the heat transfer tubes 5a on the upstream side of air flow are connected to a first connection pipe 13, and the heat transfer tubes 5a on the downstream side of air flow are connected to a second connection pipe 14. However, the heat transfer tubes 5a on the upstream side of air flow may be connected to the second connection pipe 14, and the heat transfer tubes 5a on the downstream side of air flow may be connected to the first connection pipe 13. As will be described later, when defrosting the parallel heat exchangers 50-1 and 50-2, refrigerant flowing from the second connection pipe 14 flows into the parallel heat exchangers to be defrosted and then flows out of the first connection pipe 13. Accordingly, by connecting the heat transfer tubes 5a on the upstream side of air flow to the second connection pipe 14 and connecting the heat transfer tubes 5a on the downstream side of air flow to the first connection pipe 13, heat rejected to air on the upstream side of air flow at the time of defrosting can be used for defrosting on the downstream side of air flow.

Figure 3:
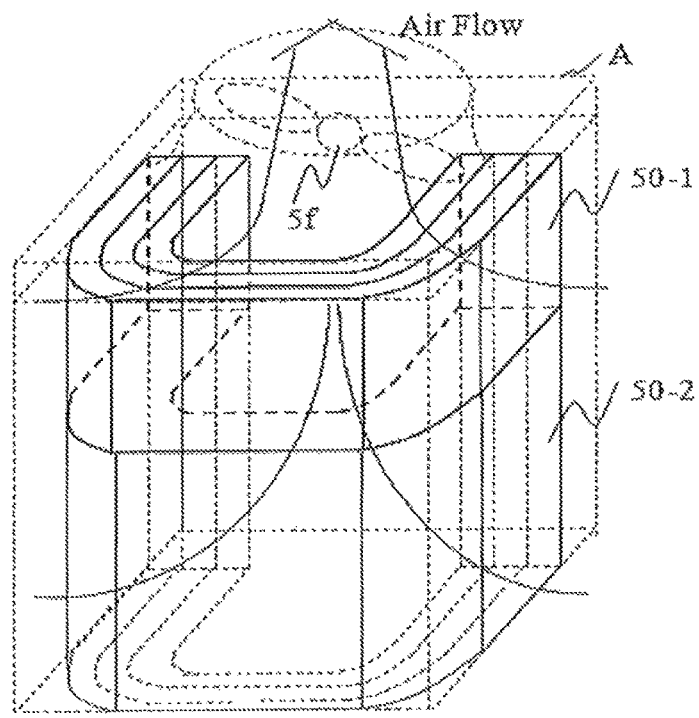
FIG. 3 is a diagram illustrating an example of the configuration of the outdoor heat exchanger 5 and an outdoor fan 5f included in an outdoor unit A according to Embodiment 1 of the present invention.

The outdoor heat exchanger 5 (the parallel heat exchangers 50-1 and 50-2) configured as in FIG. 2 is, for example, installed in the outdoor unit A of a top-flow type as illustrated in FIG. 3. In the case of the outdoor unit A of a top-flow type, the air flow rate in an upper portion of the outdoor unit A is higher than the air flow rate in a lower portion. Accordingly, to adjust the AK values of the parallel heat exchangers 50-1 and 50-2, a heat transfer area of the parallel heat exchanger 50-2 is preferably larger than a heat transfer area of the parallel heat exchanger 50-1. Here, the AK value is the product of a heat transfer area and the heat transfer rate of a heat exchanger and is a value [kW/K] representing the capacity of heat transfer rate per unit temperature.

Note that the fins 5b do not have to be divided, and each of the parallel heat exchanger 50-1 side and the parallel heat exchanger 50-2 side may include an independent fin 5b. If the outdoor heat exchanger 5 is configured such that each of the parallel heat exchanger 50-1 side and the parallel heat exchanger 50-2 side includes an independent fin 5b, the outdoor unit A may be configured as illustrated in, for example, FIG. 4.

FIG. 4 is a diagram illustrating another example of the configuration of the outdoor unit A according to Embodiment 1 of the present invention.

If the outdoor heat exchanger 5 is configured such that each of the parallel heat exchanger 50-1 side and the parallel heat exchanger 50-2 side includes an independent fin 5b, the parallel heat exchangers 50-1 and 50-2 may be installed in different outdoor units A-1 and A-2. In this case, the outdoor fan 5f may be provided for each of the outdoor units A-1 and A-2 to independently control the air flow rate, for example.

Note that although the single outdoor fan 5f delivers outside air to the parallel heat exchangers 50-1 and 50-2 in FIG. 3, the outdoor fan 5f may be provided for each of the parallel heat exchangers 50-1 and 50-2, as illustrated in FIG. 4, to independently control the air flow rate, for example. In addition, although the outdoor heat exchanger 5 is divided into the two parallel heat exchanger 50-1 and the parallel heat exchanger 50-2 in Embodiment 1, the number of divisions is not limited to two, and the outdoor heat exchanger 5 may be divided into any number greater than or equal to two.

Referring back to FIG. 1, the parallel heat exchangers 50-1 and 50-2 are connected to the second extension pipe 12 (the flow rate control devices 4-b and 4-c) via first connection pipes 13-1 and 13-2, respectively. The second expansion devices 7-1 and 7-2 are provided for the first connection pipes 13-1 and 13-2, respectively. The second expansion devices 7-1 and 7-2 are formed of electronic expansion valves, for example. The opening degrees of the second expansion devices 7-1 and 7-2 can be changed on the basis of an instruction from the controller 30. In addition, the parallel heat exchangers 50-1 and 50-2 are connected to the cooling-heating switching device 2 (the compressor 1) via second connection pipes 14-1 and 14-2, respectively. Furthermore, the second connection pipes 14-1 and 14-2 are provided with first solenoid valves 8-1 and 8-2, respectively.

The outdoor unit A in the air-conditioning apparatus 100 according to Embodiment 1 also includes, for example, a defrost pipe 15 that supplies, during a heating operation, part of high-temperature high-pressure refrigerant discharged from the compressor 1 to the outdoor heat exchanger 5 for defrosting. One end of the defrost pipe 15 is connected to the discharge pipe 1a. The other end of the defrost pipe 15 is branched, and each branch is connected to a corresponding one of the second connection pipes 14-1 and 14-2.

The defrost pipe 15 is provided with a first expansion device 10 serving as a depressurizer. The first expansion device 10 depressurizes the high-temperature high-pressure refrigerant that has flowed from the discharge pipe 1a into the defrost pipe 15 to have an intermediate pressure. The depressurized refrigerant flows to the parallel heat exchangers 50-1 and 50-2 side. Each of the branched pipes of the defrost pipe 15 is provided with a corresponding one of second solenoid valves 9-1 and 9-2. The second solenoid valves 9-1 and 9-2 control whether or not the refrigerant flowing in the defrost pipe 15 is to pass through the second connection pipes 14-1 and 14-2. Here, the first solenoid valves 8-1 and 8-2 and the second solenoid valves 9-1 and 9-2 are not limited to any particular type as long as they are valves or other mechanisms that can control the refrigerant flow, such as four-way valves, three-way valves, and two-way valves.

Here, the defrost pipe 15, the first solenoid valves 8-1 and 8-2, the second solenoid valves 9-1 and 9-2, and the second expansion devices 7-1 and 7-2 branches part of refrigerant discharged from the compressor 1 and selects one or more of the plurality of parallel heat exchangers 50 and cause the part of the refrigerant to flow into the selected one or more of the parallel heat exchangers 50, which corresponds to the defrosting circuit according to the present invention. Note that opening and closing of the first solenoid valves 8-1 and 8-2 and the second solenoid valves 9-1 and 9-2 are controlled by the controller 30.

Note that if a necessary defrosting capacity (refrigerant flow rate necessary for defrosting) is determined in advance, a capillary tube may be provided for the defrost pipe 15 as the first expansion device 10 (depressurizer). Instead of providing the first expansion device 10, the second solenoid valves 9-1 and 9-2 may be downsized so that the pressure is decreased to an intermediate pressure at the time of performing defrosting at a preset flow rate. In addition, a flow rate control device may be provided instead of the second solenoid valves 9-1 and 9-2, and the first expansion device 10 may be omitted.

Although not illustrated, the air-conditioning apparatus 100 is equipped with detectors (sensors) such as a pressure sensor and a temperature sensor because the controller 30 controls the frequency of the compressor 1 and devices serving as actuators, such as the outdoor fan 5f and various flow rate control devices. Here, sensors that are necessary for determining the execution of intermediate-pressure defrosting and the completion of defrosting are particularly described. The defrost pipe 15 is provided with a pressure sensor 21 that detects the refrigerant pressure inside the pipe (the refrigerant pressure inside a parallel heat exchanger 50 if the corresponding second solenoid valve 9 is open). In addition, the first connection pipes 13-1 and 13-2, which are pipes on the refrigerant outlet side at the time of defrosting the parallel heat exchangers 50-1 and 50-2, are provided with temperature sensors 22-1 and 22-2 that each measure the temperature of refrigerant. At the time of controlling the pressure in a parallel heat exchanger 50 (the outdoor heat exchanger 5) that is a defrosting target, the value detected by the pressure sensor 21 is used. In addition, to calculate a degree of subcooling SC, which is used for determining the completion of defrosting, on the refrigerant outlet side of the outdoor heat exchanger 5, a temperature difference between the saturated liquid temperature according to the pressure sensor 21 and the temperatures detected by the temperature sensors 22-1 and 22-2 is used. Here, to detect the pressure in a parallel heat exchanger 50 (the refrigerant pressure in a parallel heat exchanger 50) that is the defrosting target, instead of the pressure sensor 21, for example, a pressure sensor may be provided for each of the first connection pipes 13-1 and 13-2.

Next, operations performed by the air-conditioning apparatus 100 will be described.

Figure 5:
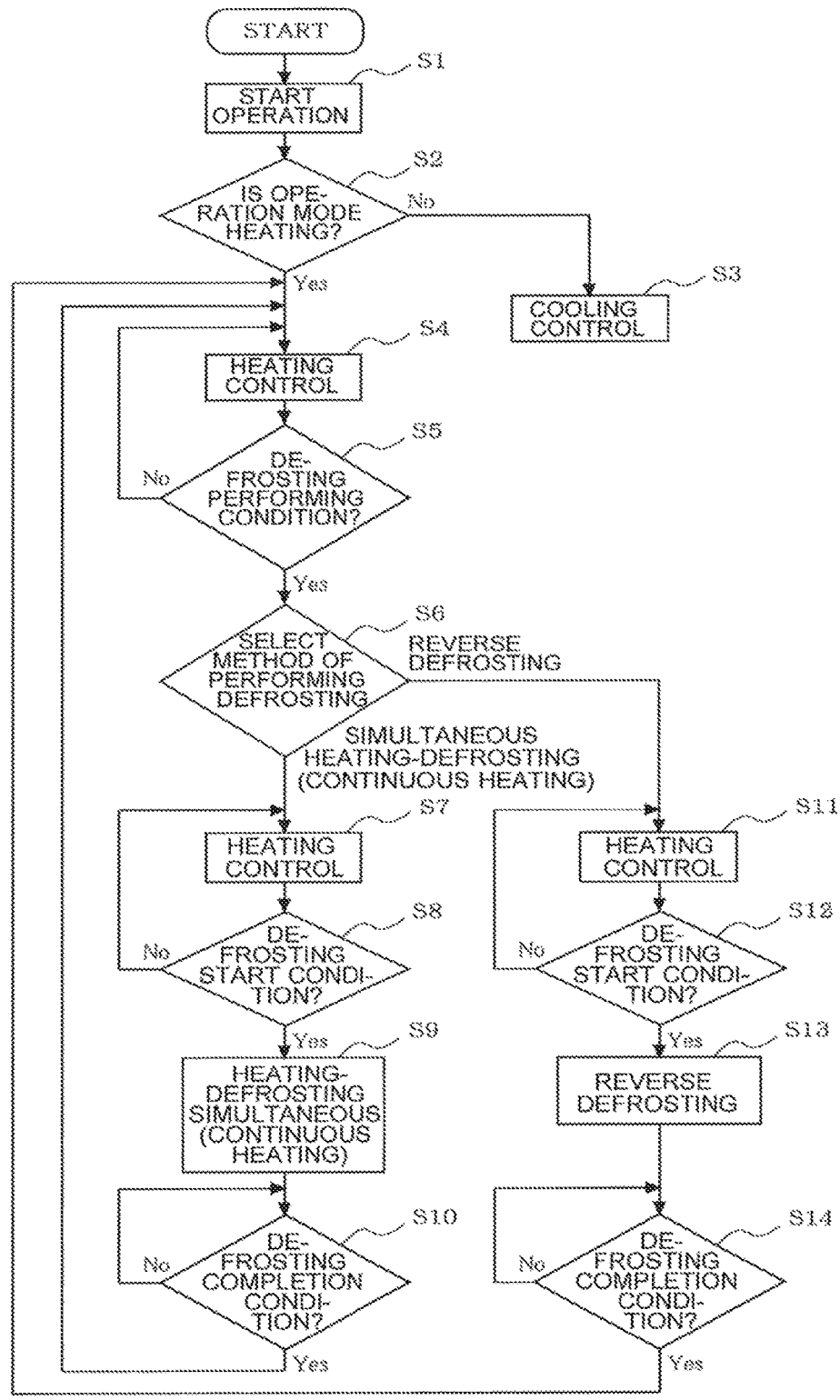
FIG. 5 is a diagram illustrating an example of a control flow of the air-conditioning apparatus 100 according to Embodiment 1 of the present invention.

FIG. 5 is a diagram illustrating an example of a control flow of the air-conditioning apparatus 100 according to Embodiment 1 of the present invention.

An operation of the air-conditioning apparatus 100 has two types of operation modes, a cooling operation and a heating operation. Upon start of the operation of the air-conditioning apparatus (S1), in response to an instruction from a user by using a remote control or the like, the controller 30 sets a cooling operation or a heating operation as the operation mode of an indoor unit (S2 to S4). During a heating operation, the controller 30 controls the cooling-heating switching device 2, the flow rate control devices 4-b and 4-c, the second expansion devices 7-1 and 7-2, the first solenoid valves 8-1 and 8-2, the second solenoid valves 9-1 and 9-2, the first expansion device 10, and the like and performs a normal heating operation (S4), a reverse-defrosting operation (S13), and a heating-defrosting simultaneous operation (also referred to as a continuous heating operation, S9). The normal heating operation (S4) is an operation mode in which both of the parallel heat exchangers 50-1 and 50-2 included in the outdoor heat exchanger 5 serve as normal evaporators. The reverse-defrosting operation (S13) is an operation mode in which the cooling-heating switching device 2 is switched in such a manner that the passage of refrigerant discharged from the compressor 1 is connected to the parallel heat exchangers 50-1 and 50-2, that is, heating performed by the indoor units B and C is stopped, and all of the parallel heat exchangers (both the parallel heat exchangers 50-1 and 50-2) are defrosted. The heating-defrosting simultaneous operation (S9) is an operation mode in which, by the above-described defrosting circuit, refrigerant discharged from the compressor 1 is allowed to flow into one or more of the parallel heat exchangers 50, the one or more of the parallel heat exchangers serve as heat exchangers that are defrosting targets, and one or more of the parallel heat exchangers 50 other than the heat exchangers that are defrosting targets serve as evaporators. That is, the heating-defrosting simultaneous operation is an operation in which defrosting is performed alternately on the parallel heat exchanger 50-1 and the parallel heat exchanger 50-2 while the heating operation is continued. For example, while the heating operation is performed by using one of the parallel heat exchangers, the parallel heat exchanger 50-1, as an evaporator, the other of the parallel heat exchangers, the parallel heat exchanger 50-2, is defrosted. Then, upon completion of defrosting of the parallel heat exchanger 50-2, the heating operation is performed by using the parallel heat exchanger 50-2 in turn as an evaporator, and the parallel heat exchanger 50-1 is defrosted.

During the normal heating operation, the reverse-defrosting operation and the heating-defrosting simultaneous operation is performed if it is determined that frost is deposited on the outdoor heat exchanger 5 on the basis of a decrease in the pressure on the low-pressure side of the refrigeration cycle, the detected temperature of a heat exchanger, and the like. Note that details of the method for determining the start of defrosting (details of steps in and after S4) and the like in each operation will be described with reference to FIG. 21 and the following drawings.

FIG. 6 is a diagram illustrating ON/OFF of each valve and the state of opening-degree adjusting control in each operation mode of the air-conditioning apparatus 100 according to Embodiment 1 of the present invention.

In FIG. 6, ON of the cooling-heating switching device 2 indicates a case where the four-way valve, for example, is connected as indicated by solid lines in FIG. 1, and OFF indicates a case where the four-way valve is connected as indicated by dotted lines. In addition, ON of the first solenoid valves 8-1 and 8-2 and the second solenoid valves 9-1 and 9-2 indicates a case where the valves are open to allow refrigerant to flow, and OFF indicates a case where the valves are closed.

[Cooling Operation]

Figure 7:
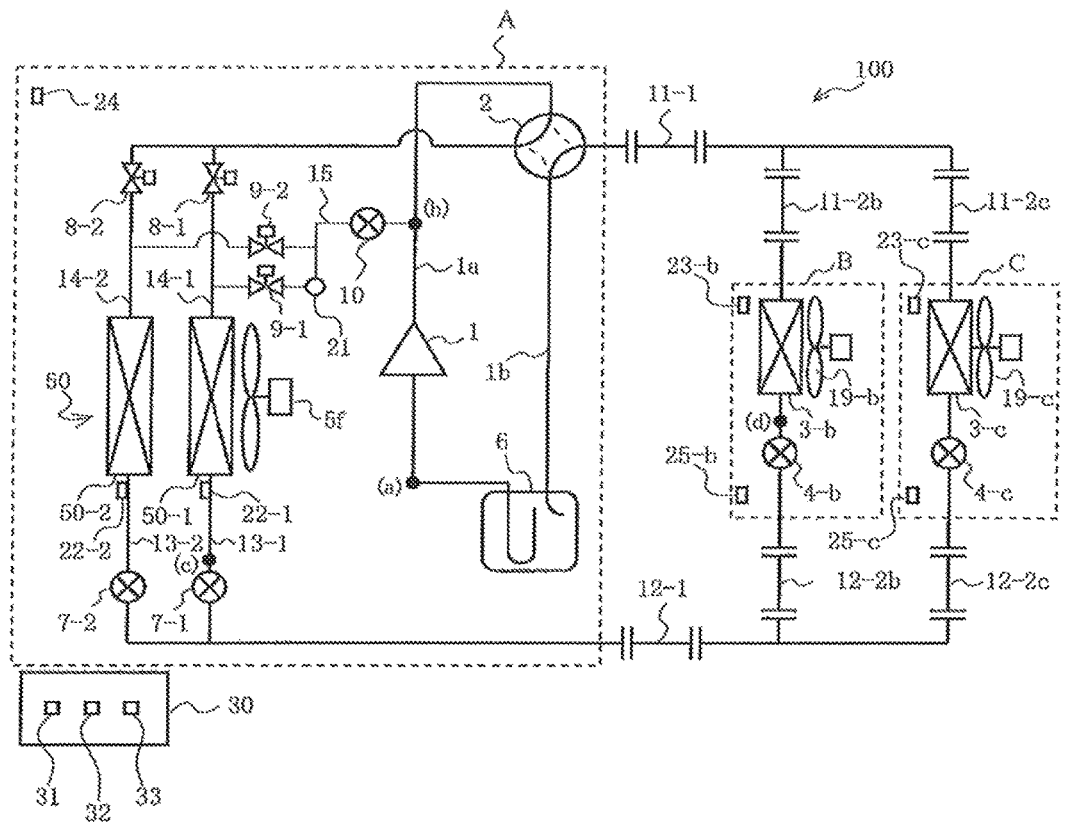
FIG. 7 is a diagram illustrating the refrigerant flow at the time of a cooling operation performed by the air-conditioning apparatus 100 according to Embodiment 1 of the present invention.

FIG. 7 is a diagram illustrating the refrigerant flow at the time of a cooling operation performed by the air-conditioning apparatus 100 according to Embodiment 1 of the present invention. In FIG. 7, the section in which refrigerant flows during a cooling operation is represented as a solid line, and the section in which refrigerant does not flow is represented as a thin line.

Figure 8:
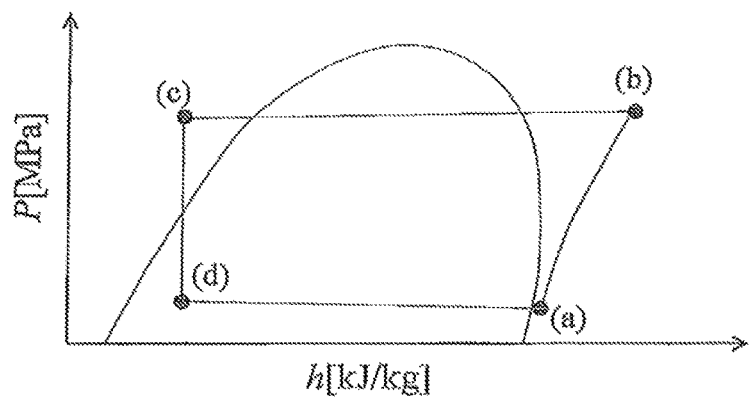
FIG. 8 is a P-h diagram at the time of a cooling operation performed by the air-conditioning apparatus 100 according to Embodiment 1 of the present invention.

FIG. 8 is a P-h diagram at the time of a cooling operation performed by the air-conditioning apparatus 100 according to Embodiment 1 of the present invention. Here, points (a) to (d) in FIG. 8 represent the states of refrigerant in sections denoted by the same symbols in FIG. 7.

The compressor 1 sucks and compresses a low-temperature low-pressure gas refrigerant and discharges a high-temperature high-pressure gas refrigerant (from point (a) to point (b) in FIG. 8). The high-temperature high-pressure gas refrigerant discharged from the compressor 1 passes through the cooling-heating switching device 2 and through the first solenoid valve 8-1 and the second connection pipe 14-1, or through the first solenoid valve 8-2 and the second connection pipe 14-2, to flow into the parallel heat exchanger 50-1 or 50-2, heats outside air and is cooled, and is condensed to become an intermediate-temperature high-pressure liquid refrigerant (from point (b) to point (c) in FIG. 8).

The intermediate-temperature high-pressure liquid refrigerant that has flowed from the parallel heat exchangers 50-1 and 50-2 passes through the first connection pipes 13-1 and 13-2, the second expansion devices 7-1 and 7-2 in a full-open state, and the second extension pipe 12-1, is branched by the second extension pipes 12-2b and 12-2c, and passes through the flow rate control devices 4-b and 4-c. The refrigerant that has passed through the flow rate control devices 4-b and 4-c is expanded and depressurized to become a low-temperature low-pressure two-phase gas-liquid state (from point (c) to point (d) in FIG. 8).

The refrigerant in the low-temperature low-pressure two-phase gas-liquid state that has flowed from the flow rate control devices 4-b and 4-c flows into the indoor heat exchangers 3-b and 3-c, cools indoor air, and is heated to become a low-temperature low-pressure gas refrigerant. Here, the controller 30 controls the flow rate control devices 4-b and 4-c in such a manner that the degree of superheat of the low-temperature low-pressure gas refrigerant becomes about 2K to 5K (from point (d) to point (a) in FIG. 8).

The low-temperature low-pressure gas refrigerant that has flowed from the indoor heat exchangers 3-b and 3-c passes through the first extension pipes 11-2b and 11-2c to be merged, and further passes through the first extension pipe 11-1, the cooling-heating switching device 2, and the accumulator 6 to be sucked into the compressor 1.

[Normal Heating Operation]

Figure 9:
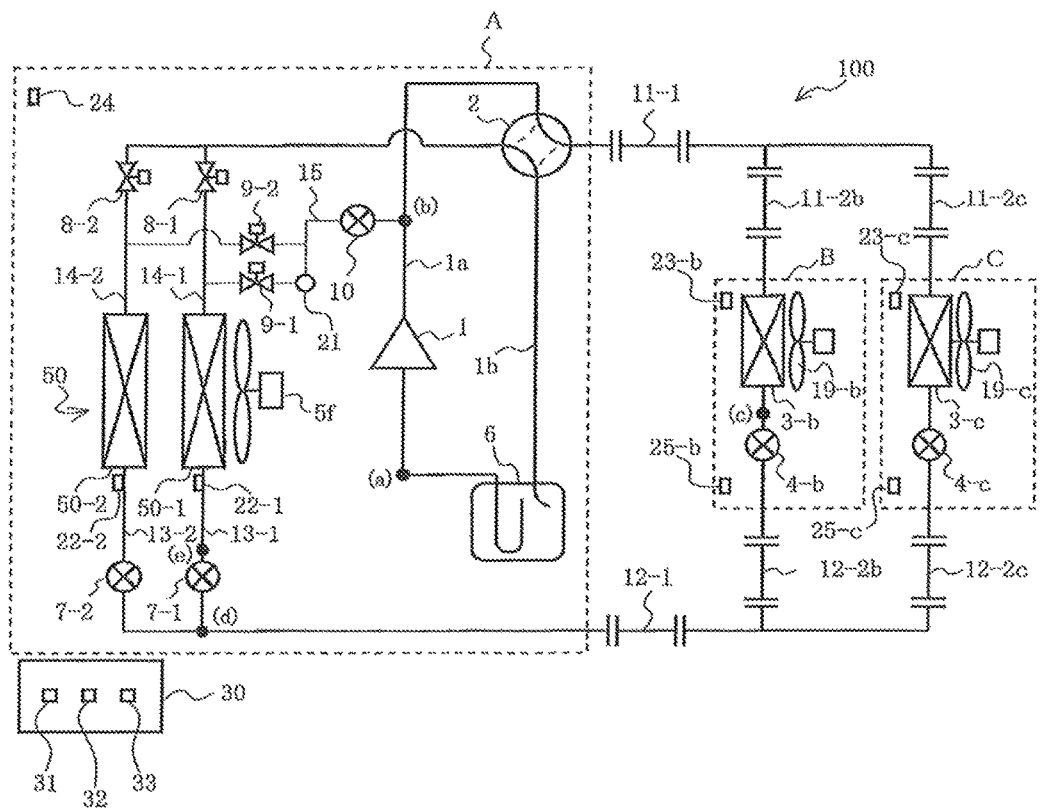
FIG. 9 is a diagram illustrating the refrigerant flow at the time of a normal heating operation performed by the air-conditioning apparatus 100 according to Embodiment 1 of the present invention.

FIG. 9 is a diagram illustrating the refrigerant flow at the time of a normal heating operation performed by the air-conditioning apparatus 100 according to Embodiment 1 of the present invention. In FIG. 9, the section in which refrigerant flows during a normal heating operation is represented as a solid line, and the section in which refrigerant does not flow is represented as a thin line.

Figure 10:
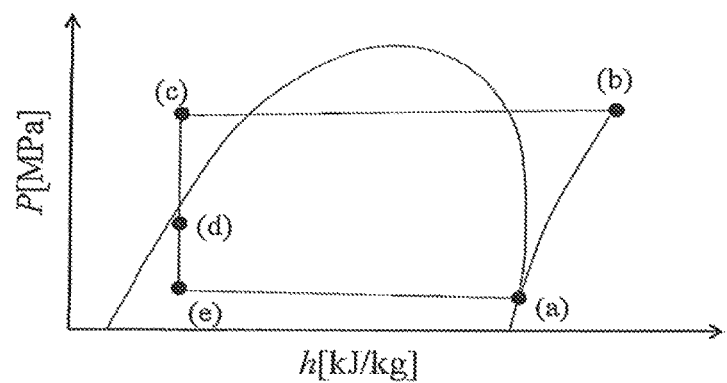
FIG. 10 is a P-h diagram at the time of a normal heating operation performed by the air-conditioning apparatus 100 according to Embodiment 1 of the present invention.

FIG. 10 is a P-h diagram at the time of a normal heating operation performed by the air-conditioning apparatus 100 according to Embodiment 1 of the present invention. Points (a) to (e) in FIG. 10 represent the states of refrigerant in sections denoted by the same symbols in FIG. 9.

The compressor 1 sucks and compresses a low-temperature low-pressure gas refrigerant and discharges a high-temperature high-pressure gas refrigerant (from point (a) to point (b) in FIG. 10). The high-temperature high-pressure gas refrigerant discharged from the compressor 1 passes through the cooling-heating switching device 2 and the first extension pipe 11-1 and is branched by the first extension pipes 11-2b and 11-2c to flow into the indoor heat exchangers 3-b and 3-c in the indoor units B and C, heats indoor air and is cooled, and is condensed to become an intermediate-temperature high-pressure liquid refrigerant (from point (b) to point (c) in FIG. 10).

The intermediate-temperature high-pressure liquid refrigerant that has flowed from the indoor heat exchangers 3-b and 3-c passes through the flow rate control devices 4-b and 4-c and is expanded and depressurized to become an intermediate-pressure two-phase gas-liquid state (from point (c) to point (d) in FIG. 10). Here, the controller 30 controls the flow rate control devices 4-b and 4-c in such a manner that the degree of subcooling (degree of supercooling) of the intermediate-temperature high-pressure liquid refrigerant is about 5K to 20K.

The refrigerant in the intermediate-pressure two-phase gas-liquid state that has flowed from the flow rate control devices 4-b and 4-c passes through the second extension pipes 12-2b and 12-2c to be merged, and passes through the second extension pipe 12-1, and is branched by the first connection pipes 13-1 and 13-2. At this time, the refrigerant passes through the second expansion devices 7-1 and 7-2. The refrigerant that has passed through the second expansion devices 7-1 and 7-2 is expanded and depressurized to become a low-pressure two-phase gas-liquid state (from point (d) to point (e) in FIG. 10). Here, the controller 30 controls the second expansion devices 7-1 and 7-2 in such a manner that the second expansion devices 7-1 and 7-2 has a fixed opening degree, for example, in the full-open state, or that the saturation temperature of the intermediate pressure in the second extension pipe 12-1 or the like is about zero degrees Celsius to twenty degrees Celsius.

The refrigerant that has flowed from the first connection pipes 13-1 and 13-2 (the second expansion devices 7-1 and 7-2) flows into the parallel heat exchangers 50-1 and 50-2, cools outside air and is heated, and is evaporated to become a low-temperature low-pressure gas refrigerant (from point (e) to point (a) in FIG. 10).

The low-temperature low-pressure gas refrigerant that has flowed from the parallel heat exchangers 50-1 and 50-2 passes through the second connection pipes 14-1 and 14-2 and the first solenoid valves 8-1 and 8-2 to be merged, and further passes through the cooling-heating switching device 2 and the accumulator 6 to be sucked into the compressor 1.

[Reverse-Defrosting Operation]

The reverse-defrosting operation (S13 in FIG. 5) is performed if, during a normal heating operation, frost is detected on the outdoor heat exchanger 5 and it is determined that defrosting needs to be performed (S5 and S12 in FIG. 5) and if the reverse-defrosting operation mode is selected (S6 in FIG. 5). If the outside air temperature is low (e.g., if the outside air temperature is below zero degrees Celsius at and below which heat for removing frost be obtained from outside air or below minus five degrees Celsius at and below which the amount of heat rejected to outside air is increased), the reverse-defrosting operation is selected because it takes time to melt frost if the heating-defrosting simultaneous operation is selected. Alternatively, after repeating the heating-defrosting simultaneous operation several times, the reverse-defrosting operation may be selected to once obtain a state where no frost is deposited on the outdoor heat exchanger 5.

If the reverse-defrosting operation is performed, the cooling-heating switching device 2 is connected as in a cooling operation, and a high-temperature gas refrigerant discharged from the compressor 1 is allowed to flow into the parallel heat exchangers 50-1 and 50-2. In the parallel heat exchangers 50-1 and 50-2, the refrigerant is cooled while melting a layer of frost on the fins 5b. Then, the refrigerant that has flowed from the parallel heat exchangers 50-1 and 50-2 passes through the second expansion devices 7-1 and 7-2, the second extension pipes 12-1, 12-2b, and 12-2c, the flow rate control devices 4-b and 4-c, the indoor heat exchangers 3-b and 3-c, the first extension pipes 11-2b, 11-2c, and 11-1, the cooling-heating switching device 2, and the accumulator 6 to be sucked into the compressor 1. Meanwhile, to prevent indoor occupants from feeling cool winds, the indoor units B and C stop the indoor fans 19-b and 19-c so as not to exchange heat between the cold refrigerant and indoor air. In addition, to prevent the pressure of refrigerant to be sucked into the compressor 1 from being decreased as much as possible, the second expansion devices 7-1 and 7-2 and the flow rate control devices 4-b and 4-c are full open.

[Heating-Defrosting Simultaneous Operation (Continuous Heating Operation)]

The heating-defrosting simultaneous operation (S9 in FIG. 5) is performed if, during a normal heating operation, frost is detected on the outdoor heat exchanger 5 and it is determined that defrosting needs to be performed (S5 and S8 in FIG. 5) and if the heating-defrosting simultaneous operation mode is selected (S6 in FIG. 5). The method for detecting frost and switching from the normal heating operation will be described later.

In the configuration of the air-conditioning apparatus 100 according to Embodiment 1, in the heating-defrosting simultaneous operation, an operation can be performed in which the parallel heat exchanger 50-2 is defrosted and heating is continued by operating the parallel heat exchanger 50-1 as an evaporator. Conversely, an operation can be performed in which heating is continued by operating the parallel heat exchanger 50-2 as an evaporator and the parallel heat exchanger 50-1 is defrosted. These operations are the same except for the reversing between the opening and closing states of the first solenoid valves 8-1 and 8-2 and the opening and closing states of the second solenoid valves 9-1 and 9-2, and switching of the refrigerant flow in the parallel heat exchanger 50-1 and the parallel heat exchanger 50-2. Accordingly, the operation in which the parallel heat exchanger 50-2 is defrosted and heating is continued by operating the parallel heat exchanger 50-1 as an evaporator will be described below. The same applies to the description in the following embodiments.

Figure 11:
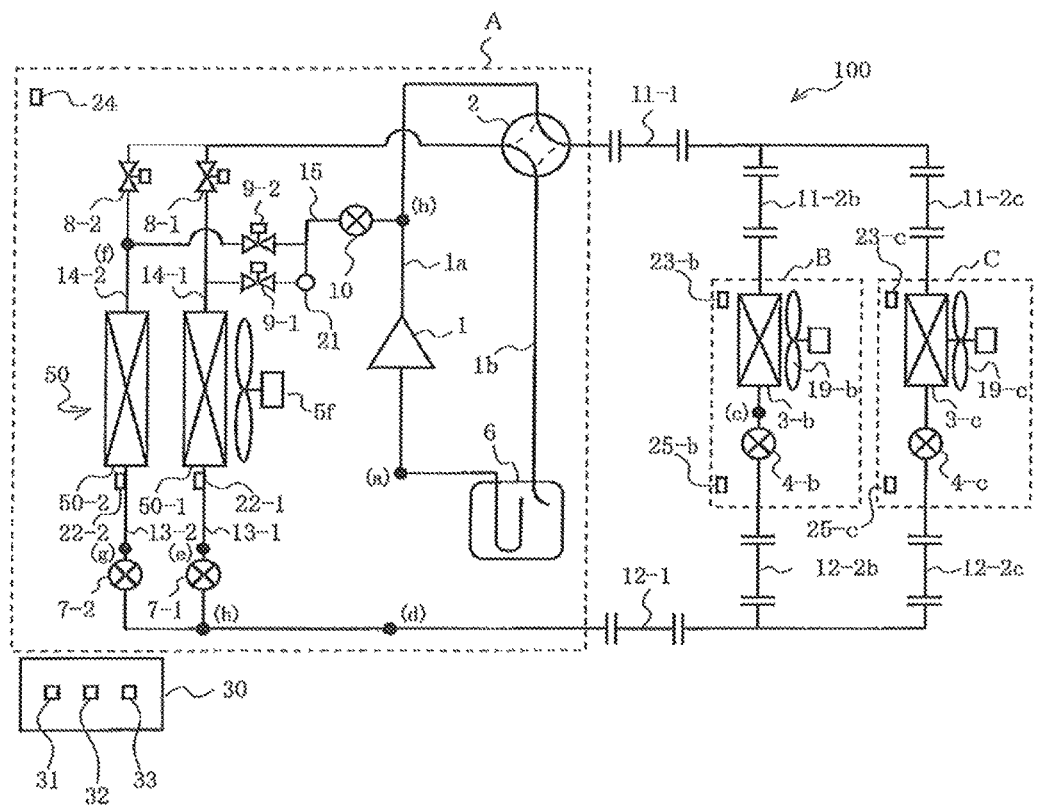
FIG. 11 is a diagram illustrating the refrigerant flow at the time of a heating-defrosting simultaneous operation performed by the air-conditioning apparatus 100 according to Embodiment 1 of the present invention.

FIG. 11 is a diagram illustrating the refrigerant flow at the time of a heating-defrosting simultaneous operation performed by the air-conditioning apparatus 100 according to Embodiment 1 of the present invention. In FIG. 11, the section in which refrigerant flows during a heating-defrosting simultaneous operation is represented as a solid line, and the section in which refrigerant does not flow is represented as a thin line.

Figure 12:
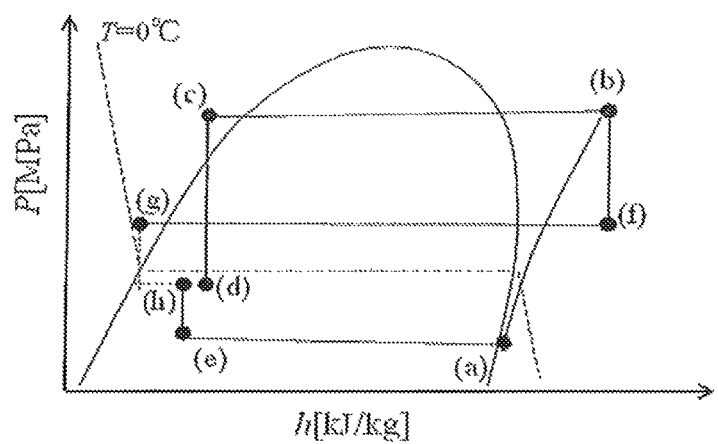
FIG. 12 is a P-h diagram at the time of a heating-defrosting simultaneous operation performed by the air-conditioning apparatus 100 according to Embodiment 1 of the present invention.

FIG. 12 is a P-h diagram at the time of a heating-defrosting simultaneous operation performed by the air-conditioning apparatus 100 according to Embodiment 1 of the present invention. Here, points (a) to (h) in FIG. 12 represent the states of refrigerant in sections denoted by the same symbols in FIG. 11.

If it is determined that defrosting is necessary to eliminate frost while performing a normal heating operation, the controller 30 closes the first solenoid valve 8-2 corresponding to the parallel heat exchanger 50-2 that is the defrosting target. The controller 30 further performs control to open the second solenoid valve 9-2 and sets the opening degree of the first expansion device 10 to a preset opening degree. Thus, in addition to the main circuit, an intermediate-pressure defrosting circuit is formed in which the compressor 1, the first expansion device 10, the second solenoid valve 9-2, the parallel heat exchanger 50-2, the second expansion device 7-2, and the second expansion device 7-1 are sequentially connected, and the heating-defrosting simultaneous operation is started.

Upon start of the heating-defrosting simultaneous operation, part of a high-temperature high-pressure gas refrigerant discharged from the compressor 1 flows into the defrost pipe 15 and is depressurized to an intermediate pressure by the first expansion device 10. The change in the refrigerant at this time is represented by point (b) to point (f) in FIG. 12. Then, the refrigerant that has been depressurized to the intermediate pressure (point (f)) passes through the second solenoid valve 9-2 to flow into the parallel heat exchanger 50-2. The refrigerant that has flowed into the parallel heat exchanger 50-2 is cooled by exchanging heat with frost deposited on the parallel heat exchanger 50-2. In this manner, by causing the high-temperature high-pressure gas refrigerant discharged from the compressor 1 to flow into the parallel heat exchanger 50-2, frost deposited on the parallel heat exchanger 50-2 can melt. The change in the refrigerant at this time is represented by point (f) to point (g) in FIG. 12. Here, the refrigerant used for defrosting has a saturation temperature of zero degrees Celsius to about ten degrees Celsius (0.8 MPa to 1.1 MPa if R410A refrigerant is used) that is higher than or equal to the temperature (zero degrees Celsius) of frost.

On the other hand, the pressure of refrigerant (point (d)) in the main circuit is lower than the pressure at point (g) by increasing the opening degree of the second expansion device 7-1. Thus, the refrigerant (point (g)) after defrosting can return to the main circuit through the second expansion device 7-2. If the resistance of the valve of the second expansion device 7-1 is excessively high, the pressure at point (d) becomes higher than the pressure at point (g), and there is possibility that the pressure at point (g) cannot be controlled to be zero degrees Celsius to ten degrees Celsius in the saturation temperature conversion. Accordingly, the flow rate coefficient (Cv value) of the valve of the second expansion device 7-1 needs to be designed in accordance with the flow rate of a mainstream refrigerant. Note that the same applies to the second expansion device 7-2 because there may be a case where the parallel heat exchanger 50-1 is defrosted and the parallel heat exchanger 50-2 serves as an evaporator.

The refrigerant after defrosting passes through the second expansion device 7-2 to be merged with the main circuit (point (h)). The merged refrigerant flows into the parallel heat exchanger 50-1 that is serving as an evaporator and is evaporated through heat exchange with outside air.

Figure 13:
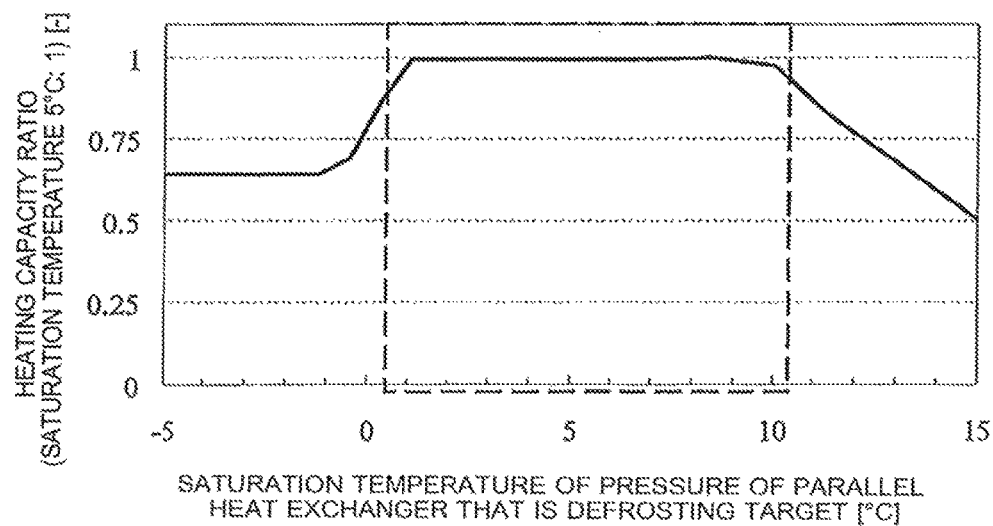
FIG. 13 is a graph illustrating the relationship between a saturation temperature and a heating capacity Qheat based on the pressure in a parallel heat exchanger 50 that is a defrosting target according to Embodiment 1 of the present invention.

FIG. 13 is a graph illustrating the relationship between the saturation temperature and a heating capacity Qheat based on the pressure in a parallel heat exchanger 50 that is the defrosting target according to Embodiment 1 of the present invention. FIG. 13 illustrates results of calculation of the heating capacity Qheat in a case where, in the air-conditioning apparatus 100 using R410A refrigerant as refrigerant, the pressure (converted to a saturated liquid temperature in FIG. 13) in the parallel heat exchanger 50 that is the defrosting target is changed while keeping a defrosting capacity Qdef fixed. Note that in FIG. 13, calculation is performed by setting the heating capacity Qheat indoors to 1 in a case where the pressure in the parallel heat exchanger 50 that is the defrosting target is five degrees Celsius in the saturation temperature.

Figure 14:
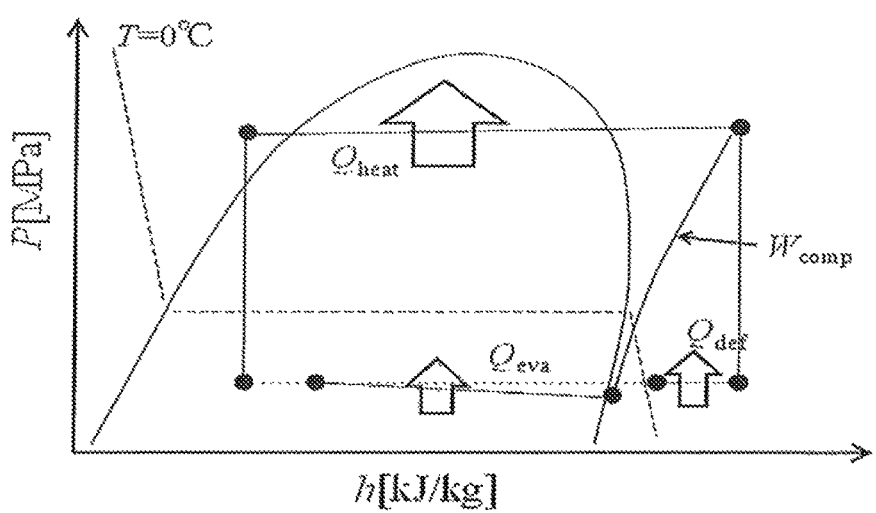
FIG. 14 is a P-h diagram of a heating-defrosting simultaneous operation in which, in the saturation temperature conversion, the pressure in a parallel heat exchanger 50 that is the defrosting target in the outdoor heat exchanger 5 according to Embodiment 1 of the present invention is lower than a temperature for melting ice and in which defrosting is performed without using latent heat of condensation.

FIG. 14 is a P-h diagram of a heating-defrosting simultaneous operation in which, in the saturation temperature conversion, the pressure in a parallel heat exchanger 50 that is the defrosting target in the outdoor heat exchanger 5 according to Embodiment 1 of the present invention is lower than a temperature for melting ice and in which defrosting is performed without using latent heat of condensation.

Figure 15:
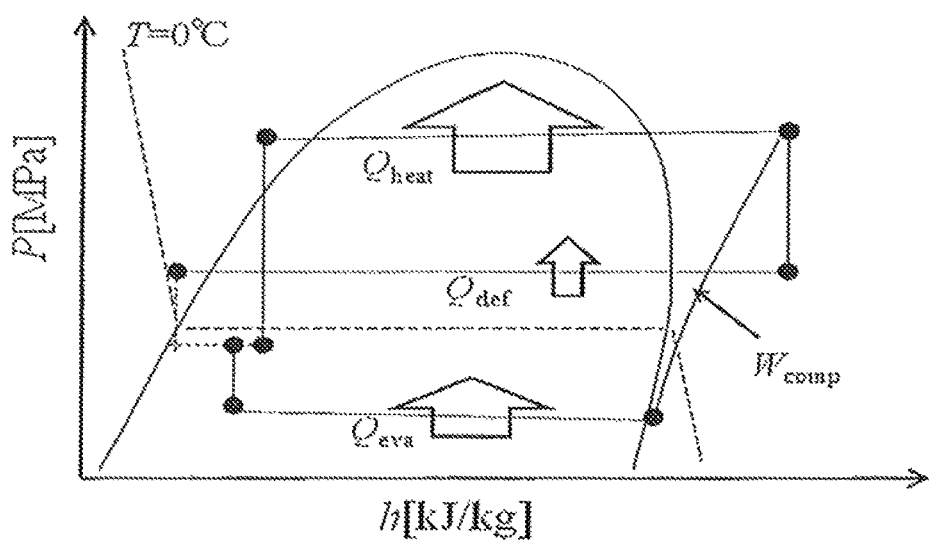
FIG. 15 is a P-h diagram of a heating-defrosting simultaneous operation in which, in the saturation temperature conversion, the pressure in a parallel heat exchanger 50 that is the defrosting target in the outdoor heat exchanger 5 according to Embodiment 1 of the present invention is higher than the temperature for melting ice and in which defrosting is performed using latent heat of condensation.

FIG. 15 is a P-h diagram of a heating-defrosting simultaneous operation in which, in the saturation temperature conversion, the pressure in a parallel heat exchanger 50 that is the defrosting target in the outdoor heat exchanger 5 according to Embodiment 1 of the present invention is higher than the temperature for melting ice and in which defrosting is performed using latent heat of condensation.

Figure 16:
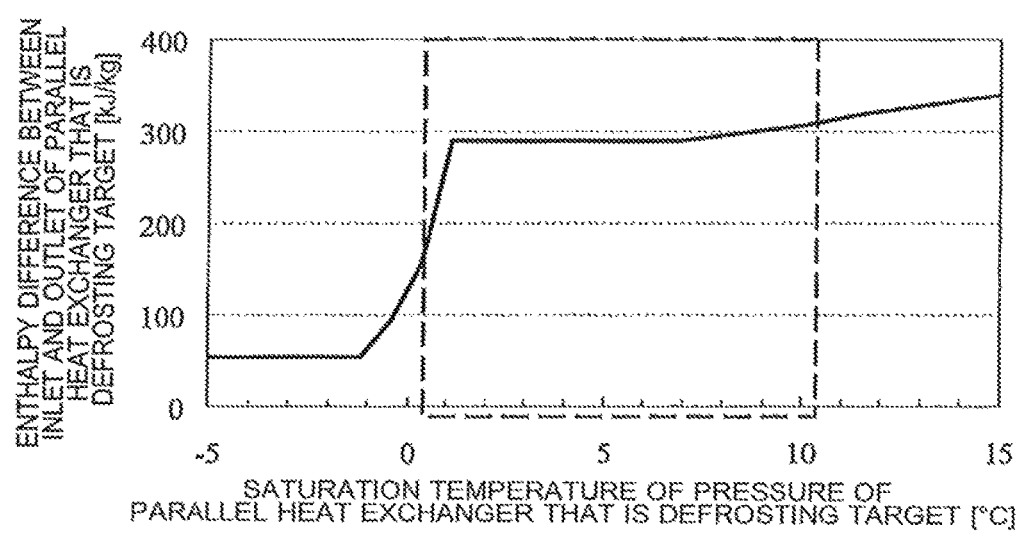
FIG. 16 is a graph illustrating the relationship between the saturation temperature and an enthalpy difference between the inlet and the outlet of a parallel heat exchanger 50 that is the defrosting target based on the pressure in the parallel heat exchanger 50 that is the defrosting target according to Embodiment 1 of the present invention.

FIG. 16 is a graph illustrating the relationship between the saturation temperature and an enthalpy difference between the inlet and the outlet of a parallel heat exchanger 50 that is the defrosting target based on the pressure in the parallel heat exchanger 50 that is the defrosting target according to Embodiment 1 of the present invention. FIG. 16 illustrates results of calculation of the enthalpy difference between the inlet and the outlet of the parallel heat exchanger 50 that is the defrosting target in a case where, in the air-conditioning apparatus 100 using R410A refrigerant as refrigerant, the pressure (converted to a saturated liquid temperature in FIG. 16) in the parallel heat exchanger 50 that is the defrosting target is changed while keeping the defrosting capacity Qdef fixed.

Figure 17:
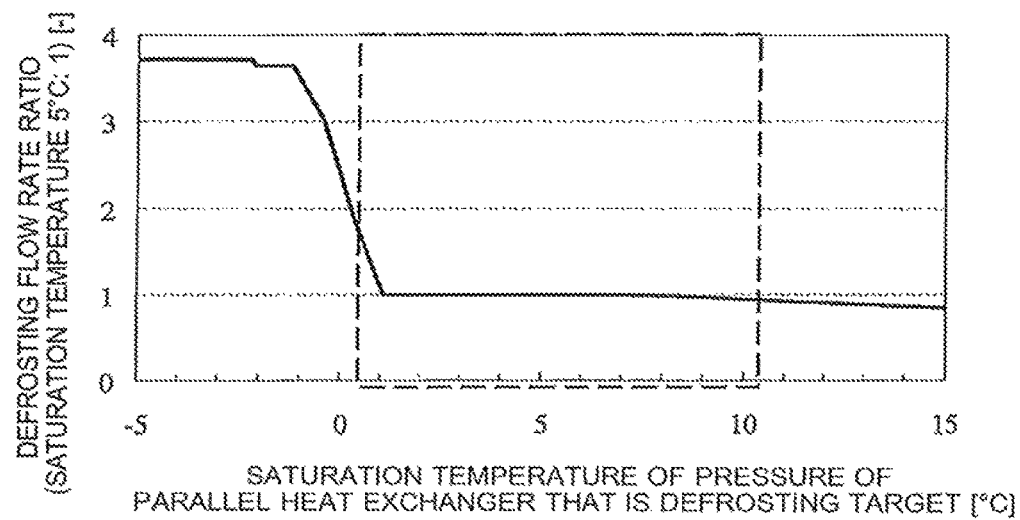
FIG. 17 is a graph illustrating the relationship between the saturation temperature and a defrosting flow rate ratio based on the pressure in a parallel heat exchanger 50 that is the defrosting target according to Embodiment 1 of the present invention.

FIG. 17 is a graph illustrating the relationship between the saturation temperature and a defrosting flow rate ratio based on the pressure in a parallel heat exchanger 50 that is the defrosting target according to Embodiment 1 of the present invention. FIG. 17 illustrates results of calculation of the refrigerant flow rate necessary for defrosting in a case where, in the air-conditioning apparatus 100 using R410A refrigerant as refrigerant, the pressure (converted to a saturated liquid temperature in FIG. 17) in the parallel heat exchanger 50 that is the defrosting target is changed while keeping the defrosting capacity Qdef fixed.

Figure 18:
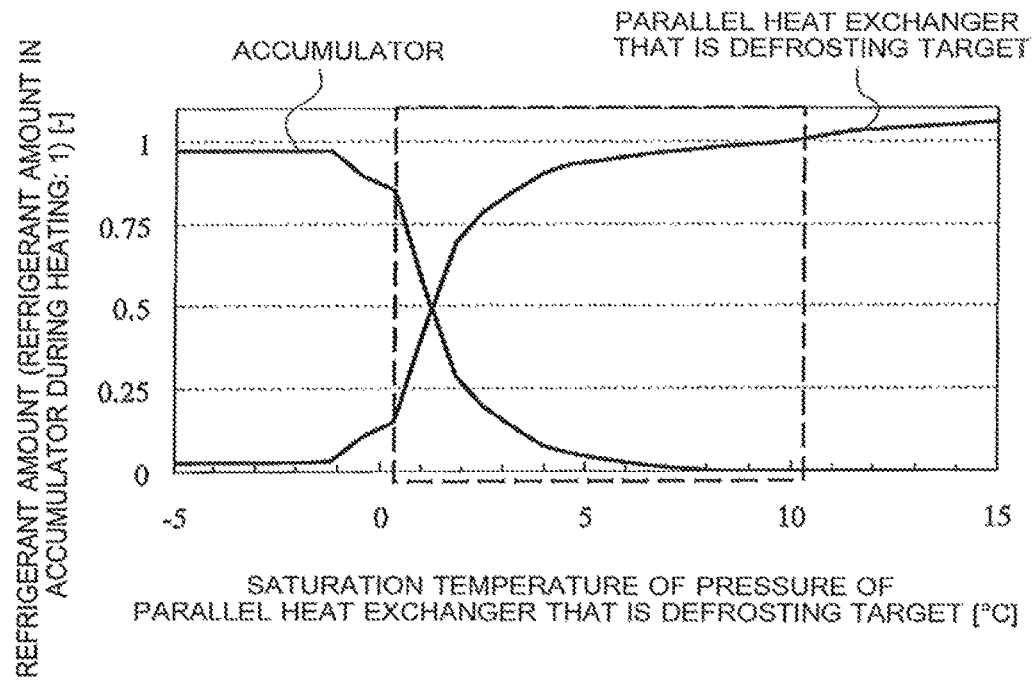
FIG. 18 is a graph illustrating the relationship between the saturation temperature and the refrigerant amount based on the pressure in a parallel heat exchanger 50 that is the defrosting target according to Embodiment 1 of the present invention.

FIG. 18 is a graph illustrating the relationship between the saturation temperature and the refrigerant amount based on the pressure in a parallel heat exchanger 50 that is the defrosting target according to Embodiment 1 of the present invention. FIG. 18 illustrates results of calculation of the refrigerant amount in each of the accumulator 6 and the parallel heat exchanger 50 that is the defrosting target in a case where, in the air-conditioning apparatus 100 using R410A refrigerant as refrigerant, the pressure (converted to a saturated liquid temperature in FIG. 18) in the parallel heat exchanger 50 that is the defrosting target is changed while keeping the defrosting capacity Qdef fixed.

Figure 19:
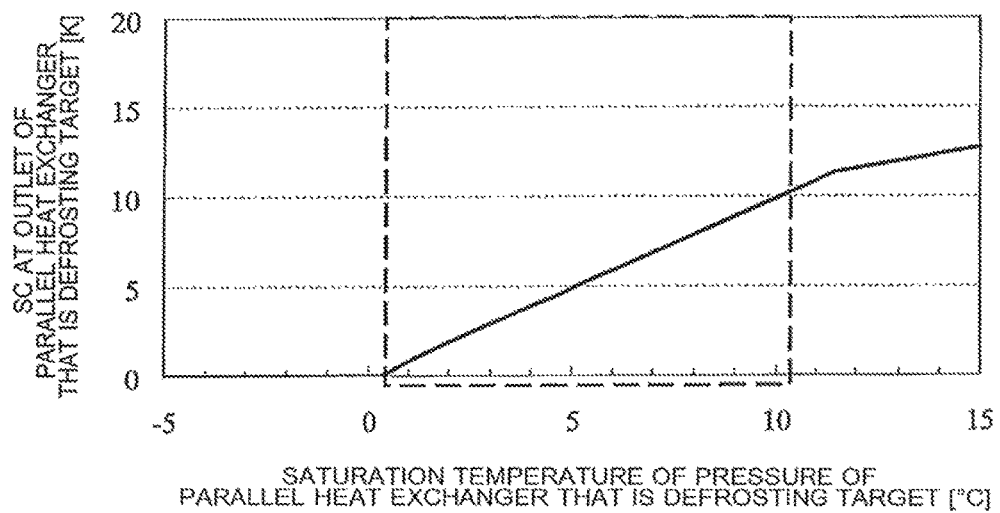
FIG. 19 is a graph illustrating the relationship between the saturation temperature and the degree of subcooling based on the pressure in a parallel heat exchanger 50 that is the defrosting target according to Embodiment 1 of the present invention.

FIG. 19 is a graph illustrating the relationship between the saturation temperature and the degree of subcooling based on the pressure in a parallel heat exchanger 50 that is the defrosting target according to Embodiment 1 of the present invention. FIG. 19 illustrates results of calculation of the degree of subcooling (degree of supercooling) SC on the refrigerant outlet side of the parallel heat exchanger 50 that is the defrosting target in a case where, in the air-conditioning apparatus 100 using R410A refrigerant as refrigerant, the pressure (converted to a saturated liquid temperature in FIG. 19) in the parallel heat exchanger 50 that is the defrosting target is changed while keeping the defrosting capacity Qdef fixed.

As illustrated in FIG. 13, it is found that the heating capacity Qheat is increased in a case where the saturation temperature of refrigerant for defrosting is higher than zero degrees Celsius and lower than or equal to about ten degrees Celsius and that the heating capacity is decreased in other cases.

First, causes of decreasing the heating capacity in a case where the saturated liquid temperature is lower than or equal to zero degrees Celsius will be described with reference to FIGS. 14 to 17. It is necessary to make the temperature of refrigerant higher than zero degrees Celsius to melt frost. As illustrated in the P-h diagram in FIG. 14 and FIG. 16, if it is attempted to melt frost by making the saturated liquid temperature lower than or equal to zero degrees Celsius, the latent heat of condensation of refrigerant cannot be used, and defrosting is performed only by using sensible heat, and accordingly, the enthalpy difference between the inlet and the outlet of the parallel heat exchanger 50 that is the defrosting target is decreased. At this time, to exhibit the defrosting capacity as in a case where the saturated liquid temperature of refrigerant used for defrosting is optimal, which is between zero degrees Celsius to ten degrees Celsius (FIG. 15), about three or four times the flow rate is necessary (FIG. 17) to cause refrigerant to flow into the parallel heat exchanger 50 that is the defrosting target. Since the refrigerant flow rate that can be supplied to the indoor units B and C to perform heating is decreased by the same amount, the heating capacity is decreased. Accordingly, if the saturated liquid temperature is made lower than or equal to zero degrees Celsius, the heating capacity is decreased. Therefore, it is necessary that the pressure in the parallel heat exchanger 50 that is the defrosting target be made higher than zero degrees Celsius in the saturated liquid temperature conversion.

On the other hand, if the pressure in the parallel heat exchanger 50 that is the defrosting target is increased, as illustrated in FIG. 19, the degree of subcooling SC at the refrigerant outlet of the parallel heat exchanger 50 that is the defrosting target is increased. Thus, the amount of a liquid refrigerant is increased, and the refrigerant density is increased. Since a typical multi-air-conditioner for building needs a larger refrigerant amount during a cooling operation than during a heating operation, during a heating operation, surplus refrigerant is present in a liquid container such as the accumulator 6.

However, as illustrated in FIG. 18, as the pressure in the parallel heat exchanger 50 that is the defrosting target is increased (the saturation temperature is increased), the refrigerant amount that is necessary for defrosting is increased. Accordingly, the amount of refrigerant accumulated in the accumulator 6 is decreased, and the accumulator 6 becomes empty at a saturation temperature of about ten degrees Celsius. If there is no surplus liquid refrigerant in the accumulator 6, refrigerant becomes insufficient in the refrigerant circuit, and the suction density of the compressor 1 is decreased, for example, which results in a decrease in the heating capacity.

Here, if the air-conditioning apparatus is overcharged with refrigerant, the upper limit of the saturation temperature can be increased. However, surplus refrigerant may overflow from the accumulator 6 during another operation, for example, which degrades the reliability of the air-conditioning apparatus 100. Accordingly, the air-conditioning apparatus is preferably charged with an appropriate amount of refrigerant. In addition, as the saturation temperature is increased, the temperature difference between refrigerant in a heat exchanger and frost becomes less uniform, in which case frost melts away immediately in some places but does not melt easily in other places.

From the above reasons, in the air-conditioning apparatus 100 according to Embodiment 1, the pressure in the parallel heat exchanger 50 that is the defrosting target is made higher than zero degrees Celsius and lower than or equal to ten degrees Celsius in the saturation temperature conversion. Here, considering a measure for melting frost uniformly by suppressing transfer of refrigerant during defrosting while utilizing, as much as possible, intermediate-pressure defrosting using heat of condenses, an optimal measure is to set the target value of the degree of subcooling SC of the parallel heat exchanger 50 that is the defrosting target to OK (quality of refrigerant is 0). However, considering the accuracy of a temperature sensor, a pressure sensor, and other sensors for calculating the degree of subcooling, for example, to set the degree of subcooling SC to OK to about 5K, it is desirable to set the pressure in the parallel heat exchanger 50 that is the defrosting target to be higher than zero degrees Celsius and lower than or equal to six degrees Celsius in the saturation temperature conversion.

Here, an issue that arises during a heating-defrosting simultaneous operation in which one or more of the parallel heat exchangers 50 serve as evaporators will be discussed. The energy balance in a refrigerant circuit is represented by using each heat quantity in FIG. 14 and FIG. 15 as below.

$$Qeva + W = Qheat + Qdef \quad (1)$$

In the expression, Qeva represents the amount of heat exchange performed by the parallel heat exchanger 50 that is serving as an evaporator, W represents an input to a compressor, Qheat represents a heating capacity, Qdef represents the amount (defrosting capacity) of heat exchange performed by the parallel heat exchanger 50 that is the defrosting target. Note that in Expression (1), heat rejected from the surfaces of pipes while heat is transferred, the heat capacity of each component for discussing an unsteady cycle behavior, and so on are omitted.

Here, during a reverse-defrosting operation of the related art in which heating is stopped, for example, since Qeva=0 and Qheat=0, the following is satisfied.

$$W = Qdef \quad (2)$$

That is, during a reverse-defrosting operation of the related art in which heating is stopped, for example, frost melts by electrical energy input to a compressor.

On the other hand, during the heating-defrosting simultaneous operation, the parallel heat exchanger 50 that is serving as an evaporator receives heat from outside air.

Figure 20:
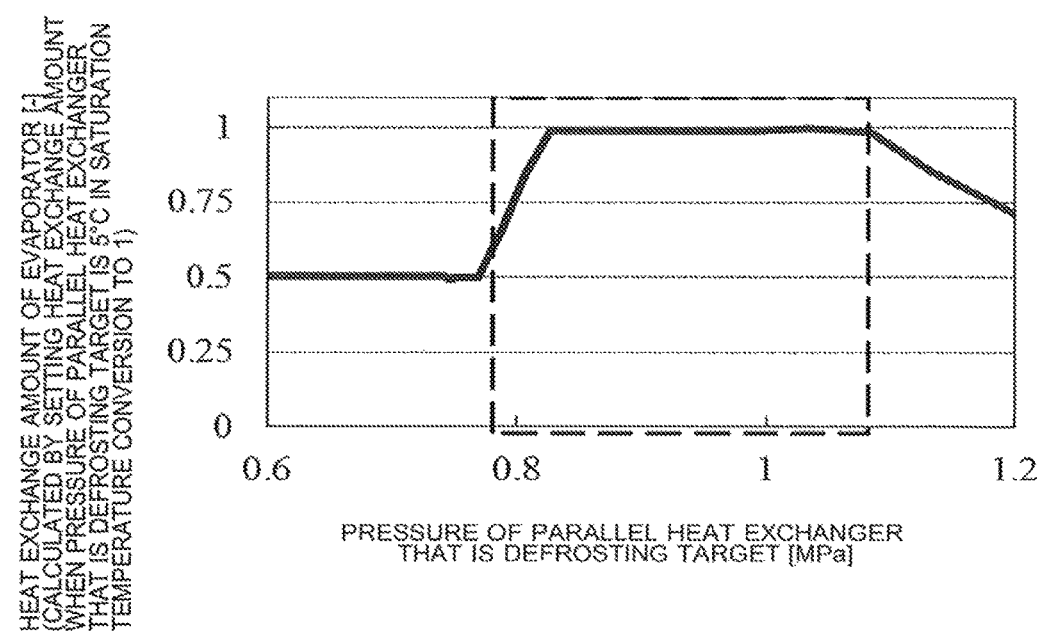
FIG. 20 is a graph illustrating the relationship between the pressure in a parallel heat exchanger 50 that is the defrosting target according to Embodiment 1 of the present invention and the amount of heat exchange Qeva performed by a parallel heat exchanger 50 that is serving as an evaporator.

FIG. 20 is a graph illustrating the relationship between the pressure in the parallel heat exchanger 50 that is the defrosting target according to Embodiment 1 of the present invention and the amount of heat exchange Qeva performed by the parallel heat exchanger 50 that is serving as an evaporator. FIG. 20 illustrates results of calculation of the amount of heat exchange Qeva performed by the parallel heat exchanger 50 that is serving as an evaporator in a case where, in the air-conditioning apparatus 100 using R410A refrigerant as refrigerant, the pressure in the parallel heat exchanger 50 that is the defrosting target is changed while keeping the defrosting capacity Qdef fixed.

To perform a reverse-defrosting operation, it has been necessary only to consider whether or not a normal heating operation can be continued during the normal heating operation as a result of an increase in the amount of frost deposited on the parallel heat exchangers 50 to switch to the defrosting operation.

On the other hand, to perform a heating-defrosting simultaneous operation, it is necessary to adjust the amount of frost formation in advance so as to obtain the heat quantity that is equal to Qeva from outside air by using the parallel heat exchangers 50 that are serving as evaporators. That is, it is necessary to determine switching of the operation mode by detecting the amount of frost formation during a normal heating operation in consideration of the heating-defrosting simultaneous operation to be performed later. In particular, during intermediate-pressure defrosting, although the heat transfer area of an evaporator is decreased, the intake heat quantity from outside air is substantially equal to the intake heat quantity during a normal heating operation, and it is important to establish a method for accurately determining switching for an increased amount of heat exchange per unit area.

Accordingly, the method (method for determining the start of defrosting) for switching to a defrosting operation mode during a normal heating operation will be discussed.

Figure 21:
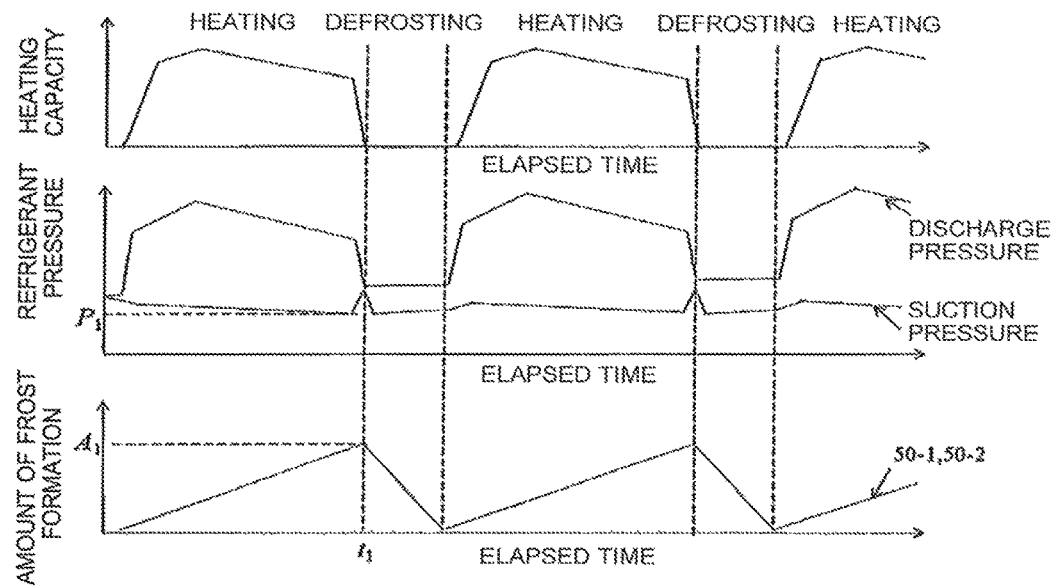
FIG. 21 is a diagram illustrating temporal changes in the heating capacity, the refrigerant pressure (the discharge pressure and the suction pressure of a compressor 1), and the amount of frost deposited on a parallel heat exchanger 50 if a reverse-defrosting operation is performed by the air-conditioning apparatus 100 according to Embodiment 1 of the present invention.

FIG. 21 is a diagram illustrating temporal changes in the heating capacity, the refrigerant pressure (the discharge pressure and the suction pressure of the compressor 1), and the amount of frost deposited on a parallel heat exchanger 50 if a reverse-defrosting operation is performed by the air-conditioning apparatus 100 according to Embodiment 1 of the present invention.

Figure 22:
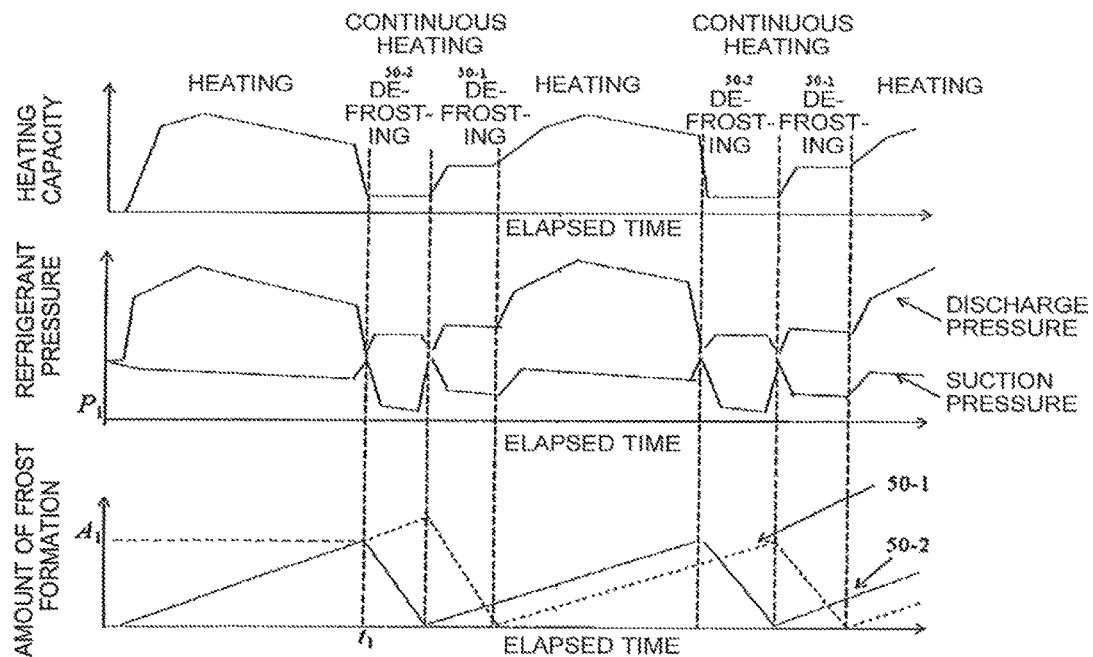
FIG. 22 is a diagram illustrating temporal changes in the heating capacity, the refrigerant pressure (the discharge pressure and the suction pressure of the compressor 1), and the amount of frost deposited on a parallel heat exchanger 50 if a heating-defrosting simultaneous operation is started in a state where the amount of frost deposited is equal to the amount of frost deposited at the time of starting a reverse-defrosting operation by the air-conditioning apparatus 100 according to Embodiment 1 of the present invention.

FIG. 22 is a diagram illustrating temporal changes in the heating capacity, the refrigerant pressure (the discharge pressure and the suction pressure of the compressor 1), and the amount of frost deposited on a parallel heat exchanger 50 if a heating-defrosting simultaneous operation is started in a state where the amount of frost formation is equal to the amount of frost formation at the time of starting a reverse-defrosting operation by the air-conditioning apparatus 100 according to Embodiment 1 of the present invention.

Figure 23:
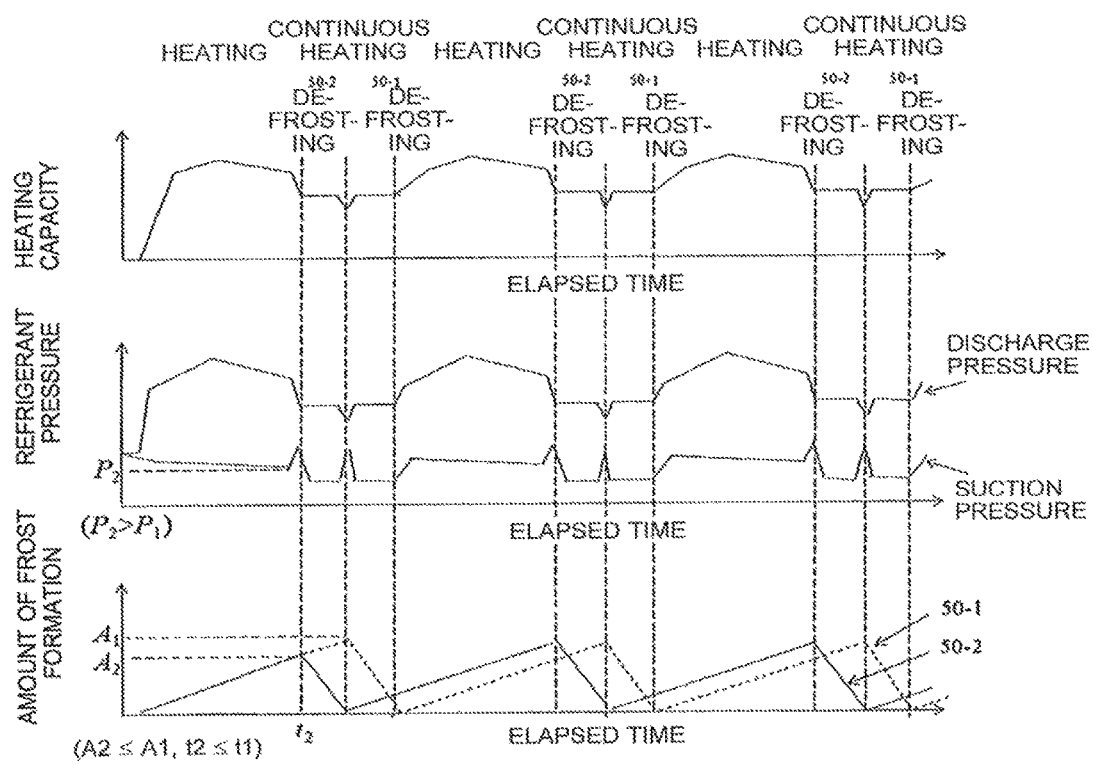
FIG. 23 is a diagram illustrating temporal changes in the heating capacity, the refrigerant pressure (the discharge pressure and the suction pressure of the compressor 1), and the amount of frost deposited on a parallel heat exchanger 50 if a heating-defrosting simultaneous operation is started in a state where the amount of frost deposited is smaller than the amount of frost deposited at the time of starting a reverse-defrosting operation by the air-conditioning apparatus 100 according to Embodiment 1 of the present invention.

FIG. 23 is a diagram illustrating temporal changes in the heating capacity, the refrigerant pressure (the discharge pressure and the suction pressure of the compressor 1), and the amount of frost deposited on a parallel heat exchanger 50 if a heating-defrosting simultaneous operation is started in a state where the amount of frost formation is smaller than the amount of frost formation at the time of starting a reverse-defrosting operation by the air-conditioning apparatus 100 according to Embodiment 1 of the present invention.

As illustrated in FIG. 22, if the heating-defrosting simultaneous operation is started in a state where the amount of frost formation is equal to the amount of frost formation at the time of starting a reverse-defrosting operation, the amount of frost deposited on the parallel heat exchanger 50-1 that is serving as an evaporator is excessively large, and the heat transfer performance of the parallel heat exchanger 50-1 is largely decreased. Accordingly, by decreasing a pressure on a low-pressure side (e.g., the suction pressure or the pressure of the evaporator), the heating capacity may be decreased, or defrosting may take time. Thus, as illustrated in FIG. 23, it is preferable to switch the normal heating operation to the heating-defrosting simultaneous operation in a state where the amount of frost formation is smaller than the amount of frost formation at the time of starting a reverse-defrosting operation, so that the parallel heat exchanger 50-2 can be operated even while the parallel heat exchanger 50-1 is defrosted.

If it is not possible to measure the amount of frost deposited on the parallel heat exchangers 50 by using a detector, an index for determining the amount of frost deposited on the parallel heat exchangers 50 may be detected, and the amount of frost formation may be estimated indirectly. For example, it may suffice that, as the index for determining the amount of frost deposited on the parallel heat exchangers 50, at least one of a normal heating operation time period, the refrigerant evaporating temperature (low-pressure-side refrigerant pressure), the refrigerant temperature in the parallel heat exchangers 50, and the heating capacity (outlet temperature) of the indoor units B and C is detected to estimate the amount of frost deposited on the parallel heat exchangers 50 from the change in the detected value. Specifically, in a case where the heating-defrosting simultaneous operation is to be performed, it may suffice that, compared with a reverse-defrosting operation, the normal heating operation time period is shortened and determination for starting defrosting is performed in a state where the refrigerant evaporating temperature (low-pressure-side refrigerant pressure) or the refrigerant temperature is high or in a state where the amount of decrease in the heating capacity (outlet temperature) of an indoor unit is small.

In Embodiment 1, the normal heating operation mode is switched to a defrosting operation mode (the reverse-defrosting operation mode or the heating-defrosting simultaneous operation mode) through, for example, the following control procedure.

[Control Procedure]

Figure 24:
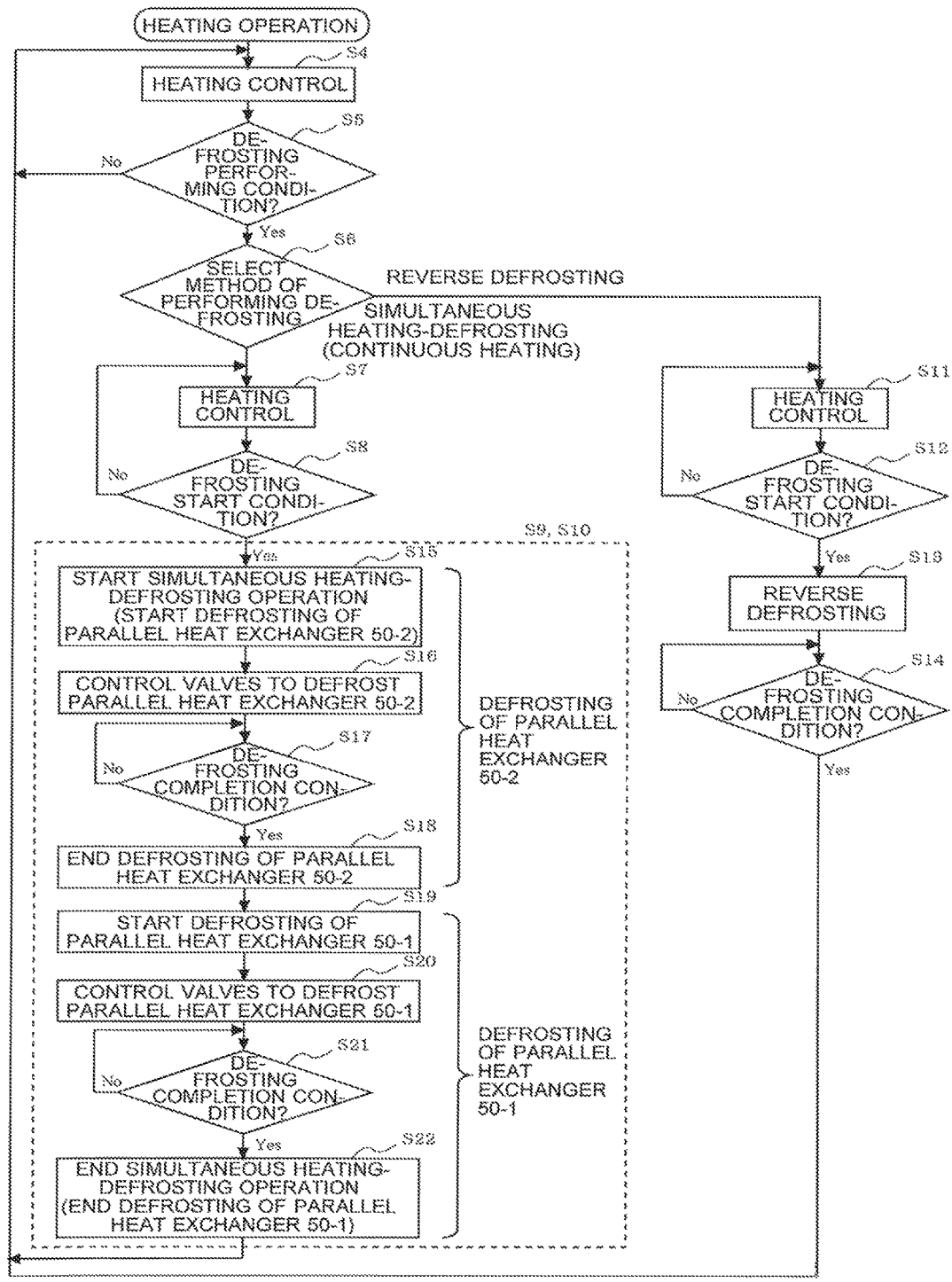
FIG. 24 is a diagram illustrating the procedure of heating control of the air-conditioning apparatus 100 performed by a controller 30 according to Embodiment 1 of the present invention.

FIG. 24 is a diagram illustrating the procedure of heating control of the air-conditioning apparatus 100 performed by the controller 30 according to Embodiment 1 of the present invention. Note that the same steps as in FIG. 5 are denoted in the same manner.

During a heating operation (S4), in terms of the outside air temperature or a load condition, under a condition where frost is estimated to be present on the surface of a fin 5b as a result of the temperature of the fin 5b of a parallel heat exchanger 50 serving as an evaporator becoming lower than or equal to zero degrees Celsius or a decrease in the low-pressure-side pressure due to snow accretion or the like, the determination unit 32 of the controller 30 determines that defrosting is to be performed (S5). For example, it may be determined whether or not defrosting is to be performed in the same manner as in S8, which will be described later.

Then, the selection unit 31 of the controller 30 selects a reverse-defrosting operation mode or a heating-defrosting simultaneous operation mode as the mode for performing a defrosting operation (S6).

For example, if a defrosting operation in the heating-defrosting simultaneous operation mode has been performed predetermined number of times (e.g., a plurality of times), the selection unit 31 selects the reverse-defrosting operation mode as the mode for performing a next-time defrosting operation.

In addition, for example, if the outside air temperature is lower than a threshold (outside air temperature threshold), the selection unit 31 of the controller 30 selects the reverse-defrosting operation mode as the mode for performing a next-time defrosting operation. As the threshold, for example, an outside air of zero degrees Celsius is set as a reference. This is because the melting temperature of frost is zero degrees Celsius and, if the outside air becomes zero degrees Celsius or lower, heat cannot be obtained from the outside air to frost. Alternatively, in accordance with the size of a heat exchanger, an outside air of minus five degrees Celsius, minus ten degrees Celsius, or the like may be set as a reference. As the outside air temperature is decreased, the amount of heat to be rejected to outside air from the parallel heat exchanger 50 that is the defrosting target is increased. In a state where the amount of heat to be rejected to outside air from the parallel heat exchanger 50 that is the defrosting target is larger than the intake heat amount from outside air in the parallel heat exchanger 50 serving as an evaporator, the reverse-defrosting operation mode is more efficient. Accordingly, the threshold is set to an outside air of about minus five degrees Celsius or minus ten degrees Celsius. In a case where the selection unit 31 selects the mode of a defrosting operation on the basis of the outside air temperature, as illustrated in FIG. 1, a temperature sensor 24 may be provided as the detector that detects the outside air temperature.

In addition, for example, the selection unit 31 of the controller 30 may detect, in the last-time heating-defrosting simultaneous operation mode, the temperature of refrigerant that flows in the parallel heat exchanger 50 that is the defrosting target and the temperature of refrigerant that flows in the parallel heat exchanger 50 serving as an evaporator, and on the basis of the average value of these temperatures, may select the mode for performing a defrosting operation. This is because, at this average temperature, the amount of heat to be received from outside air and the amount of heat to be rejected to outside air are balanced, and it is understood which of the reverse-defrosting operation and the heating-defrosting simultaneous operation is more efficient in the whole refrigeration circuit. As detectors that detect these temperatures, the temperature sensors 22-1 and 22-2 are preferably used.

Note that if an outdoor unit has the configuration illustrated in FIG. 3, for example, if the heating-defrosting simultaneous operation is performed, the parallel heat exchanger 50 serving as an evaporator receives heat from outside air and thus causes the outdoor fan 5f to be operated.

If the heating-defrosting simultaneous operation mode is selected as the mode for performing a defrosting operation, the determination unit 32 of the controller 30 determines whether or not a heating-defrosting simultaneous operation is to be started in consideration of a decrease in the heat transfer performance of the outdoor heat exchanger 5 due to a decrease in the heat transfer and air flow rate as a result of frost formation. That is, the determination unit 32 determines whether or not frost in a predetermined amount or more is deposited on the outdoor heat exchanger 5 (S8).

For example, the determination unit 32 starts the heating-defrosting simultaneous operation if the following condition is satisfied.

$$(\text{Normal Heating Operation Period}) > x1 \qquad (3)$$

That is, the time-measuring unit 33 of the controller 30, which is a detector, detects the normal heating operation time period (operation time period of a main circuit in which all of the parallel heat exchangers 50 are serving as evaporators) as an index for determining the amount of frost deposited on the outdoor heat exchanger 5 (the parallel heat exchangers 50). Then, if the normal heating operation time period is longer than x1 (operation time period threshold), the determination unit 32 starts the heating-defrosting simultaneous operation.

In addition, for example, the determination unit 32 starts the heating-defrosting simultaneous operation if the following condition is satisfied.

$$(\text{Low-Pressure-Side Pressure}) < (\text{Saturation Pressure Calculated from Outside Air Temperature}) - x2 \qquad (4)$$

That is, the detector detects the low-pressure-side pressure (pressure of refrigerant flowing in at least one of the parallel heat exchangers 50 that are serving as evaporators) as an index for determining the amount of frost deposited on the outdoor heat exchanger 5 (the parallel heat exchangers 50). Then, if the low-pressure-side pressure is lower than "saturation pressure calculated from outside air temperature−x2" (pressure threshold), the determination unit 32 starts the heating-defrosting simultaneous operation. In this case, as the detector, for example, a pressure sensor may be attached to at least one of the first connection pipes 13-1 and 13-2. In addition, by opening (ON) at least one of the second solenoid valves 9-1 and 9-2 during the normal heating operation, the pressure sensor 21 can also be used as the detector.

In addition, for example, the determination unit 32 starts the heating-defrosting simultaneous operation if the following condition is satisfied.

$$(\text{Refrigerant Temperature of Parallel Heat Exchanger } 50) < (\text{Outside Air Temperature}) - x3 \qquad (5)$$

That is, the detector detects the temperature of refrigerant flowing in at least one of the parallel heat exchangers 50 that are serving as evaporators as an index for determining the amount of frost deposited on the outdoor heat exchanger 5 (the parallel heat exchangers 50). Then, if the refrigerant temperature is lower than "outside air temperature−x3" (temperature threshold), the determination unit 32 starts the heating-defrosting simultaneous operation. In this case, as the detector, at least one of the temperature sensors 22-1 and 22-2 can be used.

In addition, for example, the determination unit 32 starts the heating-defrosting simultaneous operation if the following condition is satisfied.

$$(\text{Outlet Temperature of Indoor Unit}) < (\text{Indoor Temperature}) + x4 \qquad (6)$$

That is, the detector detects the outlet temperature of at least one of the indoor units B and C as a heating capacity of at least one of the indoor units B and C. Then, if the outlet temperature is lower than "indoor temperature+x4" (heating-capacity threshold), the determination unit 32 starts the heating-defrosting simultaneous operation. In this case, as the detector, at least one of a temperature sensor 23-b that detects the outlet temperature of the indoor unit B and a temperature sensor 23-c that detects the outlet temperature of the indoor unit C may be provided as illustrated in FIG. 1. In addition, as a detector that detects the indoor temperature, at least one of a temperature sensor 25-b that detects the temperature of inside where the indoor unit B is installed and a temperature sensor 25-c that detects the temperature of inside where the indoor unit C is installed may be provided.

Note that if the refrigeration cycle apparatus according to the present invention is used for a device other than the air-conditioning apparatus 100, the detector may detect, as the heating capacity, the temperature of a target of heat exchange after heat exchange with refrigerant flowing in a heat exchanger (a heat exchanger corresponding to the first heat exchanger according to the present invention) serving as a condenser.

Note that the determination as to whether or not the heating-defrosting simultaneous operation is to be started may be performed by employing any of the above Expressions (3) to (6) alone or in combination as a condition. In a case where whether or not the heating-defrosting simultaneous operation is to be started is determined by employing any of the above Expressions (3) to (6) in combination, the heating-defrosting simultaneous operation may be started if at least one of the employed conditions is satisfied, or the heating-defrosting simultaneous operation may be started if all of the employed conditions are satisfied.

On the other hand, in a case where the reverse-defrosting operation is selected as the mode for performing a defrosting operation, the determination unit 32 of the controller 30 determines whether or not the reverse-defrosting operation is to be started by the same method as in S8 in principle (S12).

For example, in a case of a configuration in which it is determined whether or not the heating-defrosting simultaneous operation is to be started on the basis of the normal heating operation time period in S8, in S12, the determination unit 32 starts the reverse-defrosting operation if the following condition is satisfied.

(Normal Heating Operation Period)>$x5$     (7)

That is, if the normal heating operation time period becomes longer than $x5$ (operation time period threshold), the determination unit 32 starts the reverse-defrosting operation.

In addition, for example, in a case of a configuration in which it is determined whether or not the heating-defrosting simultaneous operation is to be started on the basis of the low-pressure-side pressure in S8, in S12, the determination unit 32 starts the reverse-defrosting operation if the following condition is satisfied.

(Low-Pressure-Side Pressure)<(Saturation Pressure Calculated from Outside Air Temperature)−$x6$     (8)

That is, if the low-pressure-side pressure is lower than "saturation pressure calculated from outside air temperature−$x6$" (pressure threshold), the determination unit 32 starts the reverse-defrosting operation.

In addition, for example, in a case of a configuration in which it is determined whether or not the heating-defrosting simultaneous operation is to be started on the basis of the refrigerant temperature in at least one of the parallel heat exchangers 50 in S8, in S12, the determination unit 32 starts the reverse-defrosting operation if the following condition is satisfied.

(Refrigerant Temperature of Parallel Heat Exchanger 50)<(Outside Air Temperature)−$x7$     (9)

That is, if the refrigerant temperature is lower than "outside air temperature−$x7$" (temperature threshold), the determination unit 32 starts the reverse-defrosting operation.

In addition, for example, in a case of a configuration in which it is determined whether or not the heating-defrosting simultaneous operation is to be started on the basis of the outlet temperature of at least one of the indoor units in S8, in S12, the determination unit 32 starts the reverse-defrosting operation if the following condition is satisfied.

(Outlet Temperature of Indoor Unit)<(Indoor Temperature)+$x8$     (10)

That is, if the outlet temperature is lower than "indoor temperature+$x8$" (heating-capacity threshold), the determination unit 32 starts the reverse-defrosting operation.

Here, in the air-conditioning apparatus 100 according to Embodiment 1, the determination unit 32 is configured to start a defrosting operation in a state where the amount of frost deposited on the outdoor heat exchanger 5 (the parallel heat exchangers 50) is smaller in a case where the heating-defrosting simultaneous operation mode is selected than in a case where the reverse-defrosting operation mode is selected.

Accordingly, for example, in a case of a configuration in which it is determined whether or not a defrosting operation is to be started on the basis of the normal heating operation time period, $x1<x5$ is set. For example, $x1=40$ minutes and $x5=50$ minutes are set. In other words, the operation time period threshold ($x1$) at the time of the heating-defrosting simultaneous operation is smaller than the operation time period threshold ($x5$) at the time of the reverse-defrosting operation. That is, the determination unit 32 is configured to start a defrosting operation by using the operation time period threshold being a smaller value in a case where the heating-defrosting simultaneous operation mode is selected than in a case where the reverse-defrosting operation mode is selected.

In addition, for example, in a case of a configuration in which it is determined whether or not a defrosting operation is to be started on the basis of the low-pressure-side pressure, $x2<x6$ is set. For example, $x2=$ five degrees Celsius in saturation temperature and $x6=$ ten degrees Celsius in saturation temperature are set. In other words, the pressure threshold (saturated pressure calculated from outside air temperature−$x2$) at the time of the heating-defrosting simultaneous operation is higher than the pressure threshold (saturated pressure calculated from outside air temperature−$x6$) at the time of the reverse-defrosting operation. That is, the determination unit 32 is configured to start a defrosting operation by using the pressure threshold being a larger value in a case where the heating-defrosting simultaneous operation mode is selected than in a case where the reverse-defrosting operation mode is selected.

In addition, for example, in a case of a configuration in which it is determined whether or not a defrosting operation is to be started on the basis of the refrigerant temperature in at least one of the parallel heat exchangers 50, $x3<x7$ is set. For example, $x3=$ five degrees Celsius and $x7=$ ten degrees Celsius are set. In other words, the temperature threshold (outside air temperature−$x3$) at the time of the heating-defrosting simultaneous operation is higher than the temperature threshold (outside air temperature−$x7$) at the time of the reverse-defrosting operation. That is, the determination unit 32 is configured to start a defrosting operation by using the temperature threshold being a larger value in a case where the heating-defrosting simultaneous operation mode is selected than in a case where the reverse-defrosting operation mode is selected.

In addition, for example, in a case of a configuration in which it is determined whether or not a defrosting operation is to be started on the basis of the outlet temperature of at least one of the indoor units, $x4>x8$ is set. For example, $x4=90\%$ of outlet temperature at 100% capacity and $x8=80\%$ of outlet temperature at 100% capacity are set. In other words, the heating-capacity threshold (indoor temperature+$x4$) at the time of the heating-defrosting simultaneous operation is higher than the heating-capacity threshold (indoor temperature+$x8$) at the time of the reverse-defrosting operation. That is, the determination unit 32 is configured to start a defrosting operation by using the heating-capacity threshold being a larger value in a case where the heating-defrosting simultaneous operation mode is selected than in a case where the reverse-defrosting operation mode is selected.

By setting each threshold as described above, defrosting can be started sooner in a case where the heating-defrosting simultaneous operation is performed next time than in a case where a reverse-defrosting operation is performed. Note that in a case where a heating-defrosting operation is continuously performed, the parallel heat exchanger 50-1 is serving as an evaporator prior in order. Thus, in a case of a configuration in which it is determined whether or not a defrosting operation is to be started on the basis of the refrigerant temperature in a parallel heat exchanger 50, by employing the refrigerant temperature in the parallel heat exchanger 50-1, defrosting can be started more accurately.

In a case where the heating-defrosting simultaneous operation mode is selected in S6 and it is determined that a heating-defrosting simultaneous operation is to be started in S8, the controller 30 starts the heating-defrosting simultaneous operation in which the parallel heat exchangers 50-1 and 50-2 are alternately defrosted (S15). Here, although the example of a control method in a case where the parallel heat exchanger 50-2 on the downstream side is defrosted and the parallel heat exchanger 50-1 on the upstream side is defrosted in order in the outdoor heat exchanger 5 in FIG. 2 is described, the order may be reversed.

ON/OFF of each valve in a normal heating operation prior to the heating-defrosting simultaneous operation corresponds to the state illustrated in the column "normal heating operation" in FIG. 6. Then, from this state, the controller 30 changes the state of each valve to state (a) to state (e) as illustrated in the column "50-1: Evaporator, 50-2: Defrosting" in "heating-defrosting simultaneous operation" in FIG. 6 and starts the heating-defrosting simultaneous operation (S16).

(a) First Solenoid Valve 8-2 OFF
(b) Second Solenoid Valve 9-2 ON
(c) First Expansion Device 10 Open
(d) Second Expansion Device 7-1 Full Open
(e) Second Expansion Device 7-2 Start Control An operation is performed in which the parallel heat exchanger 50-2 that is the defrosting target is defrosted and the parallel heat exchanger 50-1 serves as an evaporator (S17) until it is determined that a defrosting completion condition that frost on the parallel heat exchanger 50-2 has melted away is satisfied. If defrosting is continued and frost deposited on the parallel heat exchanger 50-2 begins to melt, the pressure in the parallel heat exchanger 50-2 that is the defrosting target is increased, the degree of subcooling SC at the refrigerant outlet of the parallel heat exchanger 50-2 is decreased, or the opening degree of the second expansion device 7-2 is increased. Accordingly, for example, a temperature sensor and a pressure sensor may be attached to the first connection pipe 13-2 or the like, and it may be determined that defrosting is completed if any of Expressions (11) to (14) is satisfied. Here, x9 may be set to about ten degrees Celsius in the saturation temperature conversion, x10 may be set to, for example, about 50% of the maximum opening degree, x11 may be set to about 5K, and x12 may be set to about 2K.

(Pressure in Parallel Heat Exchanger 50-2 That Is Defrosting Target)>x9 (11)

(Opening Degree of Second Expansion Device 7-2)>x10 (12)

(Degree of Subcooling SC at Outlet of Parallel Heat Exchanger 50-2 That Is Defrosting Target)<x11 (13)

(Amount of Decrease from Maximum Degree of Subcooling SC at Outlet of Parallel Heat Exchanger 50-2 That Is Defrosting Target)>x12 (14)

Here, at the initial stage from the start of defrosting (about two to three minutes from the start of defrosting), refrigerant is not accumulated in the parallel heat exchanger 50-2 that is the defrosting target, and the degree of subcooling SC at the refrigerant outlet of the parallel heat exchanger 50-2 that is the defrosting target is decreased. To not erroneously determine that this is a decrease in the degree of subcooling SC as a result of frost having been melted, until a fixed time period of time (about two to three minutes) elapses from the start of defrosting, it is desirable that determination of completion be not performed on the basis of the degree of subcooling SC at the refrigerant outlet of the parallel heat exchanger 50-2 that is the defrosting target.

In addition, depending on the frost formation state due to outside air temperature, outside wind velocity, wind and snow, and the like, even if it is determined that the defrosting completion condition is satisfied, in some cases, defrosting is not actually completed. Accordingly, even if it is determined that the defrosting completion condition is satisfied by multiplying the factor of safety to melt frost completely, by continuing defrosting for a predetermined time period of time (about two to three minutes), defrosting can be performed completely, thereby increasing the reliability of the device.

Then, if it is determined that any of Expressions (11) to (14) is satisfied, and after the predetermined time period of time elapses, defrosting of the parallel heat exchanger 50-2 is completed (S18). Upon completion of defrosting of the parallel heat exchanger 50-2, the controller 30 changes the states of the second solenoid valve 9-2 and other components as in (a) to (c) below to start defrosting the parallel heat exchanger 50-1 (S19).

(a) Second Solenoid Valve 9-2 OFF
(b) First Solenoid Valve 8-2 ON
(c) Second Expansion Devices 7-1 and 7-2 Normal Intermediate-Pressure Control At this time, the controller 30 changes the state of each valve to the state illustrated in "50-1: Defrosting, 50-2: Evaporator" in "heating-defrosting simultaneous operation" in FIG. 6 (S19) and then starts defrosting the parallel heat exchanger 50-1 in turn. In (S19) to (S22), the controller 30 performs the same processing for control processing and the like, such as the determination as to whether or not the defrosting completion condition is satisfied and the defrosting completion after the predetermined time period of time has elapsed, in which the valve numbers are different from those in (S15) to (S18). Then, upon completion of defrosting of the parallel heat exchanger 50-1, the controller 30 completes the heating-defrosting simultaneous operation (S22) and performs control of a normal heating operation (S4).

As described above, by defrosting the parallel heat exchanger 50-2 located on the upstream side and the parallel heat exchanger 50-1 located on the downstream side in order in the outdoor heat exchanger 5, ice formation can be prevented.

On the other hand, in a case where the reverse-defrosting operation mode is selected in S6 and it is determined that a reverse-defrosting operation is to be started in S12, the controller 30 starts the reverse-defrosting operation in which the parallel heat exchangers 50-1 and 50-2 are simultaneously defrosted (S13).

ON/OFF of each valve in a normal heating operation prior to the reverse-defrosting operation corresponds to the state illustrated in the column "normal heating operation" in FIG. 6. Then, from this state, the controller 30 changes each valve to state (a) and state (b) as illustrated in the column "reverse defrosting" in FIG. 6 to start the reverse-defrosting operation.

(a) Cooling-Heating Switching Device 2 OFF
(b) Flow Rate Control Devices 4-b and 4-c Full Open An operation is performed in which the parallel heat exchangers 50-1 and 50-2 that are the defrosting targets are defrosted (S13) until it is determined that a defrosting completion condition that frost on the parallel heat exchangers 50-1 and 50-2 has melted away is satisfied. If defrosting is continued and frost deposited on the parallel heat exchangers 50-1 and 50-2 begins to melt, the pressures and temperatures of the parallel heat exchangers 50-1 and 0-2 that are the defrosting targets are increased. Accordingly, for example, a temperature sensor and a pressure sensor may be attached to the first connection pipe 13-2 or the like, and it may be determined that defrosting is completed if any of Expressions (15) and (16) is satisfied. Here, x13 may be set to about five degrees Celsius in the saturation temperature conversion, x10 may be set to about five degrees Celsius.

$$\text{(Pressures of Parallel Heat Exchangers 50-1 and 50-2 That Are Defrosting Targets)} > x13 \quad (15)$$

$$\text{(Temperatures at Outlets of Parallel Heat Exchangers 50-1 and 50-2 That Are Defrosting Targets)} > x14 \quad (16)$$

As described above, the air-conditioning apparatus 100 according to Embodiment 1 is configured to start a defrosting operation in a state where the amount of frost deposited on the outdoor heat exchanger 5 is smaller in a case where the heating-defrosting simultaneous operation is performed than in a case where the reverse-defrosting operation is performed. Accordingly, the air-conditioning apparatus 100 according to Embodiment 1 can continue a heating operation in a state where the heating capacity is high.

In addition, the air-conditioning apparatus 100 according to Embodiment 1 is configured to determine the start of defrosting on the basis of the heating operation continuation time period, the pressures and refrigerant temperatures in the parallel heat exchangers 50 that are the defrosting targets, and so on. Accordingly, the air-conditioning apparatus 100 according to Embodiment 1 can more accurately determine the start of defrosting during the heating-defrosting simultaneous operation.

In the air-conditioning apparatus 100 according to Embodiment 1, if the pressures in the parallel heat exchangers 50 that are the defrosting targets is made zero degrees Celsius to ten degrees Celsius in the saturation temperature conversion, although the heating capacity during a defrosting operation is increased, a large amount of heat needs to be rejected by the parallel heat exchanger 50 serving as an evaporator. Accordingly, the above-described determination as to the start is more effective.

In the air-conditioning apparatus 100 according to Embodiment 1, the controller 30 sets the threshold of the outside air temperature, and if the outside air temperature is higher than or equal to the threshold (e.g., the outside air temperature of zero degrees Celsius or minus five degrees Celsius), the heating-defrosting simultaneous operation is performed, whereas if the outside air temperature is lower than the threshold, the reverse-defrosting operation is performed in which heating performed by the indoor unit B and C is stopped and all of the plurality of parallel heat exchangers 50 are defrosted. Accordingly, the air-conditioning apparatus 100 according to Embodiment 1 can perform operations in a state where the average heating capacity is high. In a case where the outside air temperature is low, which is lower than or equal to zero degrees Celsius such as minus five degrees Celsius or minus ten degrees Celsius, the absolute humidity of outside air is naturally low, and thus, the amount of frost deposited on the parallel heat exchangers 50 is small. Accordingly, the normal operation time period becomes long until the amount of frost deposited on the parallel heat exchangers 50 becomes a predetermined amount. Thus, even if the entire surfaces of all of the parallel heat exchangers 50 are defrosted by stopping heating performed by the indoor unit B and C, the time period in which heating performed by the indoor unit B and C is stopped is short. If the heating-defrosting simultaneous operation is performed, in consideration of heat to be rejected to outside air from the parallel heat exchanger 50 that is the defrosting target, by selectively performing any of the heating-defrosting simultaneous operation and the reverse-defrosting operation in accordance with the outside air temperature, defrosting can be efficiently performed.

Here, during the reverse-defrosting operation, as illustrated in FIG. 6, setting is provided as follows: the cooling-heating switching device 2 is OFF, the second expansion devices 7-1 and 7-2 are fully open, the first solenoid valves 8-2 and 8-1 are open (ON), the second solenoid valves 9-1 and 9-2 are closed (OFF), and the first expansion device 10 is closed (OFF). Accordingly, a high-temperature high-pressure gas refrigerant discharged from the compressor 1 passes through the cooling-heating switching device 2 and the first solenoid valves 8-1 and 8-2 to flow into the parallel heat exchangers 50-1 and 50-2, and thereby can melt frost deposited on the parallel heat exchangers 50-1 and 50-2.

In addition, in a case where the parallel heat exchangers 50-1 and 50-2 are integrally configured and outside air is transferred to the parallel heat exchanger 50 that is the defrosting target by using the outdoor fan 5f as in Embodiment 1, to reduce the amount of heat to be rejected during the heating-defrosting simultaneous operation, the fan output may be changed to be decreased if the outside air temperature is low.

Embodiment 2

In the air-conditioning apparatus 100 according to Embodiment 2, the determination method for determining whether or not the heating-defrosting simultaneous operation is to be started in S8 is different from that in Embodiment 1. Specifically, the determination unit 32 of the controller 30 determines whether or not the heating-defrosting simultaneous operation is to be started according to the following Expressions (17) and (18).

[Method for Determining Start of Heating-Defrosting Simultaneous Operation in S8]

$$\text{(Heating Operation Period)} > x5 \quad (17)$$

$$\text{(Heating Operation Period)} = \text{(Normal Heating Operation Period)} + \text{(Operation Period of Heating-Defrosting Simultaneous Operation Performed Last Time)} \times 100/(100-x16) \quad (18)$$

Note that x16 (A in claims) is the ratio [%] of the AK value of a parallel heat exchanger 50 that is the defrosting target to the AK values of all of the parallel heat exchangers 50. Note that although the time on which it is determined to start the heating-defrosting simultaneous operation can be accurately obtained if the heat transfer rate K is specifically calculated, on the assumption that the heat transfer rate K is substantially in proportion to the air flow rate, and the air flow rate ratio can be simply used as a substitute. If the air flow rate ratio is unknown, the air-speed distribution may be uniform. Note that x5 is the operation time period threshold used for determination as to whether or not the reverse-defrosting operation is to be started in S12.

That is, in both a case where the heating-defrosting simultaneous operation mode is selected and a case where the reverse-defrosting operation mode is selected, the determination unit 32 according to Embodiment 2 determines whether or not a defrosting operation is to be started on the basis of the same operation time period threshold (x5). In addition, the determination unit 32 is configured to start a heating-defrosting simultaneous operation in a case where the heating-defrosting simultaneous operation mode is selected and if "Normal Heating Operation Period+Precedent Defrosting Operation Period in Heating-Defrosting Simultaneous Operation Mode×100/(100−x16)" becomes longer than the operation time period threshold (x5).

For example, if x16 is 50%, the time during the heating-defrosting simultaneous operation counts double. This is because, compared with a normal heating operation, the heat transfer area of the parallel heat exchanger 50 serving as an evaporator is reduced by half, and accordingly, frost formation is accelerated. As in the above setting, by setting the operation time period threshold (x5) to the same value regardless of the heating-defrosting simultaneous operation and the reverse-defrosting operation, and by counting the operation time period in this manner, when the heating-defrosting simultaneous operation is started, a defrosting operation can be started in a state where the amount of frost deposited on a parallel heat exchanger 50 serve as an evaporator prior in order is small, thereby simplifying control.

Embodiment 3

In the air-conditioning apparatus 100 according to Embodiment 3, the determination method for determining whether or not the heating-defrosting simultaneous operation is to be started in S8 is different from those in Embodiments 1 and 2. Specifically, in Embodiments 1 and 2, every time it is determined whether or not the heating-defrosting simultaneous operation is to be started, the operation time period threshold (x1 in Embodiment 1 and x5 in Embodiment) being the same value is used. In contrast, the determination unit 32 of the controller 30 according to Embodiment 3 determines whether or not a defrosting operation is to be started in a subsequent heating-defrosting simultaneous operation mode by using a different value of the operation time period threshold according to the following Expressions (19) and (20).

In addition, in the air-conditioning apparatus 100 according to Embodiment 3, the method for selecting a defrosting operation mode in S6 is different from those in Embodiment 1 and 2. Specifically, the selection unit 31 of the controller 30 according to Embodiment 3 selects the defrosting operation mode according to the following Expressions (21) and (22).

[Method for Determining Start of Heating-Defrosting Simultaneous Operation in S8]

In a case of a configuration in which the operation time period threshold differs when the heating-defrosting simultaneous operation mode is selected and when the reverse-defrosting operation mode is selected as in Embodiment 1, $$\text{(Normal Heating Operation Period)} > x17 \tag{19-1}$$

In a case of a configuration in which the same operation time period threshold is used when the heating-defrosting simultaneous operation mode is selected and when the reverse-defrosting operation mode is selected as in Embodiment 2, $$\text{(Normal Heating Operation Period)} + \text{(Operation Period of Heating-Defrosting Simultaneous Operation Performed Last Time)} \times 100/(100-x16) > x17 \tag{19-2}$$

Note that x17 is calculated according to the following Expression (20).

$$x17 = x18 + x19 \tag{20}$$

Here, x18 represents a time period x17 old of a precedent defrosting operation in the heating-defrosting simultaneous operation mode. In addition, x19 is a value for increasing and decreasing x17 on the basis of the time period of a precedent defrosting operation in the heating-defrosting simultaneous operation mode.

Specifically, if the time period of a precedent defrosting time period in the heating-defrosting simultaneous operation mode is longer than a predetermined time period, a negative value is substituted for x19. That is, the operation time period threshold for determining whether or not a defrosting operation is to be started in the subsequent heating-defrosting simultaneous operation mode is set to a value smaller than the threshold used for determination performed last time. Thus, under a condition in which frost is likely to be deposited on the parallel heat exchangers 50, the normal heating operation time period from the completion of the heating-defrosting simultaneous operation performed last time to the start of the heating-defrosting simultaneous operation to be performed next time can be shortened, and the air-conditioning apparatus 100 can be operated in a state where the average heating capacity is high.

In addition, if the time period of a precedent defrosting time period in the heating-defrosting simultaneous operation mode is shorter than the predetermined time period, a positive value is substituted for x19. That is, the operation time period threshold for determining whether or not a defrosting operation is to be started in the subsequent heating-defrosting simultaneous operation mode is set to a value larger than the threshold used for determination performed last time. Thus, under a condition in which frost is unlikely to be deposited on the parallel heat exchangers 50, the normal heating operation time period from the completion of the heating-defrosting simultaneous operation performed last time to the start of the heating-defrosting simultaneous operation to be performed next time can be extended, and the air-conditioning apparatus 100 can be operated in a state where the average heating capacity is high.

[Method for Selecting Defrosting Operation in S6]

If the above-described operation time period threshold x17 is set to a value smaller than the selection threshold x20 as in the following Expression (21), the selection unit 31 selects the reverse-defrosting operation mode as a defrosting operation mode.

$$x17 < x20 \tag{21}$$

On the other hand, if the above-described operation time period threshold x17 is set to a value larger than or equal to the selection threshold x20 as in the following Expression (22), the selection unit 31 selects the heating-defrosting simultaneous operation mode as a defrosting operation mode.

$$x17 \geq x20 \tag{22}$$

By performing the above-described determination, during the heating-defrosting simultaneous operation, even in a state where it takes time to defrost the parallel heat exchangers 50, and frost is likely to remain on the parallel heat exchangers 50, frost left after the reverse-defrosting operation can be removed. Accordingly, the air-conditioning apparatus 100 can be operated in a state where the average heating capacity is high.

Note that although the above Embodiments 1 to 3 describe the air-conditioning apparatus 100 that can perform both cooling and heating, the present invention can be implemented as long as the air-conditioning apparatus 100 can perform at least heating.

In addition, although the above Embodiments 1 to 3 describe the air-conditioning apparatus using the refrigeration cycle apparatus according to the present invention as an example of the refrigeration cycle apparatus according to the present invention, the air-conditioning apparatus is not limited thereto. For example, the refrigeration cycle apparatus according to the present invention can be used for another device such as a refrigerator device or a freezer device.

REFERENCE SIGNS LIST 1 compressor 1a discharge pipe 1b suction pipe 2 cooling-heating switching device (flow switching device) 3-b, 3-c indoor heat exchanger 4-b, 4-c flow rate control device 5 outdoor heat exchanger 5a heat transfer tube 5b fin 5f outdoor fan 6 accumulator 7-1, 7-2 second expansion device 8-1, 8-2 first solenoid valve 9-1, 9-2 second solenoid valve 10 first expansion device 11-1, 11-2b, 11-2c first extension pipe 12-1, 12-2b, 12-2c second extension pipe 13-1, 13-2 first connection pipe 14-1, 14-2 second connection pipe 15 defrost pipe 19-b, 19-c indoor fan 21 pressure sensor 22-1, 22-2, 23-b, 23-c, 24, 25-b, 25-c temperature sensor 30 controller 31 selection unit 32 determination unit 33 time-measuring unit 50-1, 50-2 parallel heat exchanger 100 air-conditioning apparatus A, A-1, A-2 outdoor unit B, C indoor unit.

The invention claimed is:

1. A refrigeration cycle apparatus comprising:
a main circuit including a compressor, a flow switching valve configured to switch a passage of refrigerant discharged from the compressor, a first heat exchanger configured to serve at least as a condenser, a flow rate adjusting expansion valve provided for the first heat exchanger, and a plurality of parallel heat exchangers provided in parallel with each other and each being a second heat exchanger configured to serve at least as an evaporator;
a defrosting circuit configured to branch part of the refrigerant discharged from the compressor and allow the branched refrigerant to flow into selected one or more of the plurality of parallel heat exchangers;
a detector configured to detect, as an index for determining an amount of frost deposited on the parallel heat exchangers, an operation time period of the main circuit during which all of the parallel heat exchangers serve as evaporators; and
a controller configured to control the flow switching valve and the defrosting circuit,
the controller including circuitry configured to
select one of a reverse-defrosting operation mode and a heating-defrosting simultaneous operation mode as a mode for performing a defrosting operation for defrosting the parallel heat exchangers,
the reverse-defrosting operation mode being an operation mode in which the flow switching valve is switched to connect the passage of the refrigerant discharged from the compressor to the second heat exchanger to defrost all of the parallel heat exchangers,
the heating-defrosting simultaneous operation mode being an operation mode in which the refrigerant discharged from the compressor is allowed to flow into one or more of the parallel heat exchangers by the defrosting circuit, the one or more of the parallel heat exchangers serving as heat exchangers that are defrosting targets, and one or more of the parallel heat exchangers other than the heat exchangers that are defrosting targets serving as evaporators, and
determine whether or not the defrosting operation is to be started based on a result of detection performed by the detector,
in the determination, the circuitry being configured to start the defrosting operation when the operation time period detected by the detector is longer than an operation time period threshold, the operation time period threshold being a smaller value when the heating-defrosting simultaneous operation mode is selected than when the reverse-defrosting operation mode is selected.

2. A refrigeration cycle apparatus comprising:
a main circuit including a compressor, a flow switching valve configured to switch a passage of refrigerant discharged from the compressor, a first heat exchanger configured to serve at least as a condenser, a flow rate adjusting expansion valve provided for the first heat exchanger, and a plurality of parallel heat exchangers provided in parallel with each other and each being a second heat exchanger configured to serve at least as an evaporator;
a defrosting circuit configured to branch part of the refrigerant discharged from the compressor and allow the branched refrigerant to flow into selected one or more of the plurality of parallel heat exchangers;
a detector configured to detect, as an index for determining an amount of frost deposited on the parallel heat exchangers, an operation time period of the main circuit in which all of the parallel heat exchangers serve as evaporators, and
a controller configured to control the flow switching valve and the defrosting circuit,
the controller including circuitry configured to
select one of a reverse-defrosting operation mode and a heating-defrosting simultaneous operation mode as a mode for performing a defrosting operation for defrosting the parallel heat exchangers,
the reverse-defrosting operation mode being an operation mode in which the flow switching valve is switched to connect the passage of the refrigerant discharged from the compressor to the second heat exchanger to defrost all of the parallel heat exchangers,
the heating-defrosting simultaneous operation mode being an operation mode in which the refrigerant discharged from the compressor is allowed to flow into one or more of the parallel heat exchangers by the defrosting circuit, the oneor more of the parallel heat exchangers serving as heat exchangers that are defrosting targets, and one or more of the parallel heat exchangers other than the heat exchangers that are defrosting targets serving as evaporators, and determine whether or not the defrosting operation is to be started based on a result of detection performed by the detector, wherein where a product of a heat transfer area and a heat transfer rate of a heat exchanger is defined as an AK value and where a ratio of the AK value of a heat exchanger that is the defrosting target to the AK values of all of the parallel heat exchangers is defined as A %, in the determination, the circuitry is configured to start the defrosting operation when the reverse-defrosting operation mode is selected and if the operation time period becomes longer than an operation time period threshold, and start the defrosting operation when the heating-defrosting simultaneous operation mode is selected and if a value of the following formula becomes larger than an operation time period threshold:

(the operation time period+a time period of precedent defrosting operation in the heating-defrosting simultaneous operation mode)×100/(100−$A$).

3. The refrigeration cycle apparatus claim 1, wherein
in the determination, the circuitry is configured to
when the time period of precedent defrosting operation in the heating-defrosting simultaneous operation mode is longer than a predetermined time period, set the operation time period threshold for determining whether or not the subsequent defrosting operation is to be started in the heating-defrosting simultaneous operation mode to a value smaller than the operation time period threshold used for the determination performed last time, and when the time period of precedent defrosting operation in the heating-defrosting simultaneous operation mode is shorter than the predetermined time period, set the operation time period threshold for determining whether or not the subsequent defrosting operation is to be started in the heating-defrosting simultaneous operation mode to a value larger than the operation time period threshold used for the determination performed last time.

4. The refrigeration cycle apparatus of claim 3, wherein
in the selection, the circuitry is configured to
when the operation time period threshold for determining whether or not the subsequent defrosting operation is to be started in the heating-defrosting simultaneous operation mode is smaller than a selection threshold, select the reverse-defrosting operation mode as a mode for performing the defrosting operation to be performed next time, and when the operation e period threshold for determining whether or not the subsequent defrosting operation is to be started in the heating-defrosting simultaneous operation mode is larger than or equal to the selection threshold value, select the heating-defrosting simultaneous operation mode as the mode for performing the defrosting operation to be performed next time.

5. The refrigeration cycle apparatus of claim 1, wherein
the detector sensor is further configured to detect a heating capacity of the first heat exchanger as the index for determining the amount of frost deposited on the parallel heat exchangers, and in the determination, the circuitry is configured to start the defrosting operation when the heating capacity detected by the detector is lower than a heating-capacity threshold, the heating-capacity threshold being a larger value when the heating-defrosting simultaneous operation mode is selected than when the reverse-defrosting operation mode is selected.

6. The refrigeration cycle apparatus of claim 5, wherein
the detector is configured to detect, as the heating capacity, a temperature of a heat exchange target after heat thereof is exchanged with the refrigerant flowing in the first heat exchanger serving as a condenser.

7. The refrigeration cycle apparatus of claim 1, further comprising a temperature sensor configured to detect an outside air temperature, wherein in the selection, the circuitry is configured to select a mode for performing the defrosting operation in accordance with the outside air temperature.

8. The refrigeration cycle apparatus of claim 1, wherein in the selection, the circuitry is configured to select the reverse-defrosting operation mode as the mode for the defrosting operation to be performed next time if the defrosting operation is performed predetermined times in the heating-defrosting simultaneous operation mode.

9. The refrigeration cycle apparatus of claim 1, wherein
in the heating-defrosting simultaneous operation mode,
a pressure of the refrigerant in the heat exchanger that is the defrosting target is in a range of zero degrees Celsius to ten degrees Celsius in saturation temperature conversion.

10. The refrigeration cycle apparatus of claim 2, wherein
in the determination, the circuitry is configured to
when the time period of precedent defrosting operation in the heating-defrosting simultaneous operation mode is longer than a predetermined time period, set the operation time period threshold for determining whether or not subsequent defrosting operation is to be started in the heating-defrosting simultaneous operation mode to a value smaller than the operation time period threshold used for the determination performed last time, and when the time period of the precedent defrosting operation in the heating-defrosting simultaneous operation mode is shorter than the predetermined time period, set the operation time period threshold for determining whether or not the subsequent defrosting operation is to be started in the heating-defrosting simultaneous operation mode to a value larger than the operation time period threshold used for the determination performed last time.

11. The refrigeration cycle apparatus of claim 10, wherein
in the selection, the circuitry is configured to
when the operation time period threshold for determining whether or not subsequent defrosting operation is to be started in the heating-defrosting simultaneous operation mode is smaller than a selection threshold, select the reverse-defrosting operation mode as a mode for performing the defrosting operation to be performed next time, and when the operation time period threshold for determining whether or not subsequent defrosting operation is to be started in the heating-defrosting simultaneous operation mode is larger than or equal to the selection threshold value, select the heating-defrosting simultaneous operation mode as the mode for performing the defrosting operation to be performed next time.

12. The refrigeration cycle apparatus of claim 5, wherein
the detector is configured to detect a heating capacity of the first heat exchanger as the index for determining the amount of frost deposited on thy: parallel heat exchangers, and in the determination, the circuitry is configured to start the defrosting operation when the heating capacity detected by e detector is lower than a heating-capacity threshold,
the heating-capacity threshold being a larger value when the heating-defrosting simultaneous operation mode is selected than when the reverse-defrosting operation mode is selected.

13. The refrigeration cycle apparatus of claim 2, wherein the detector is configured to detect, as the heating capacity, a temperature of a heat exchange target after heat is exchanged with the refrigerant flowing in the first heat exchanger serving as a condenser.

14. The refrigeration cycle apparatus of claim 2, further comprising a temperature sensor configured to detect an outside air temperature,
wherein in the selection, the circuitry is further configured to select a mode for performing the defrosting operation in accordance with the outside air temperature.

15. The refrigeration cycle apparatus of claim 2, wherein in the selection, the circuitry is configured to
select the reverse-defrosting operation mode as the mode for the defrosting operation to be performed next time if the defrosting operation is performed predetermined times in the heating-defrosting simultaneous operation mode.

16. The refrigeration cycle apparatus of claim 2, wherein in the heating-defrosting simultaneous operation mode,
a pressure of the refrigerant n the heat exchanger that is the defrosting target is in a range of zero degrees Celsius to ten degrees Celsius in saturation temperature conversion.

17. A refrigeration cycle apparatus comprising:
a main circuit including a compressor; a flow switching valve configured to switch a passage of refrigerant discharged from the compressor, a first heat exchanger configured to serve at least as a condenser, a flow rate adjusting expansion valve provided for the first heat exchanger, and a plurality of parallel heat exchangers provided in parallel with each other and each being configured to serve as a second heat exchanger that serves at least as an evaporator;
a defrosting circuit configured to branch part of the refrigerant discharged from the compressor to be branched and allow the branched refrigerant to flow into selected one or more of the plurality of parallel heat exchangers;
a detector configured to detect, as an index for determining an amount of frost deposited on the parallel heat exchangers, a pressure of the refrigerant flowing in at least one of the parallel heat exchangers serving as evaporators; and
a controller configured to control the flow switching valve and the defrosting circuit,
the controller including circuit configured to
select one of a reverse-defrosting operation mode and a heating-defrosting simultaneous operation mode as a mode for performing a defrosting operation for defrosting the parallel heat exchangers,
the reverse-defrosting operation mode being an operation mode in which the flow switching valve is switched to connect the passage of the refrigerant discharged from the compressor to the second heat exchanger to defrost all of the parallel heat exchangers,
the heating-defrosting simultaneous operation mode being an operation mode in which the refrigerant discharged from the compressor is allowed to flow into one or more of the parallel heat exchangers by the defrosting circuit, the one or more of the parallel heat exchangers serving as heat exchangers that are defrosting targets, and one or more of the parallel heat exchangers other than the heat exchangers that are defrosting targets serving as evaporators, and
determine whether or not the defrosting operation is to be started based on a result of detection performed by the detector,
in the determination, the circuitry being configured to start the defrosting operation when the operation time period detected by the detector is longer than an operation time period threshold, the operation time period threshold being a smaller value when the heating-defrosting simultaneous operation mode is selected than when the reverse-defrosting operation mode is selected.

18. A refrigeration cycle apparatus comprising:
a main circuit including a compressor, a flow switching valve configured to switch a passage of refrigerant discharged from the compressor, a first heat exchanger configured to serve at least as a condenser, a flow rate adjusting expansion valve provided for the first heat exchanger, and a plurality of parallel heat exchangers provided in parallel with each other and each being configured to serve as a second heat exchanger that serves at least as an evaporator;
a defrosting circuit configured to branch part of the refrigerant discharged from the compressor and allow the branched refrigerant to flow into selected one or more of the plurality of parallel heat exchangers;
a detector configured to detect, as an index for determining an amount of frost deposited on the parallel heat exchangers, a temperature of the refrigerant flowing in at least one of the parallel heat exchangers serving as evaporators; and
a controller configured to control the flow switching valve and the defrosting circuit,
the controller including circuitry configured to
select one of a reverse-defrosting operation mode and a heating-defrosting simultaneous operation mode as a mode for performing a defrosting operation for defrosting the parallel heat exchangers,
the reverse-defrosting operation mode being an operation mode in which the flow switching valve is switched to connect the passage of the refrigerant discharged from the compressor to the second heat exchanger to defrost all of the parallel heat exchangers,
the heating-defrosting simultaneous operation mode being an operation mode in which the refrigerant discharged from the compressor is allowed to flow into one or more of the parallel heat exchangers by the defrosting circuit, the one or more of the parallel heat exchangers serving as heat exchangers that are defrosting targets, and one or more of the parallel heat exchangers other than the heat exchangers that are defrosting targets serving as evaporators, and
determine whether or not the defrosting operation is to be started based on a result of detection performed by the detector,
in the determination, the circuitry being configured to start the defrosting operation when the temperature detected by the detector is lower than a temperature threshold, the temperature threshold being a larger value in a case where the heating-defrosting simultaneous operation mode is selected than in a case where the reverse-defrosting operation mode is selected.

19. The refrigeration cycle apparatus of claim 18, wherein the detector is configured to detect the temperature of the refrigerant flowing in a parallel heat exchanger, serving as an evaporator prior in order in the heating-defrosting simultaneous operation mode, of the parallel heat exchangers.

\* \* \* \* \*